United States Patent
Nakajima

(10) Patent No.: US 9,086,907 B2
(45) Date of Patent: Jul. 21, 2015

(54) APPARATUS AND METHOD FOR MANAGING VIRTUAL MACHINE ADDRESSES

(75) Inventor: Hiroshi Nakajima, Nishitokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 156 days.

(21) Appl. No.: 13/608,362

(22) Filed: Sep. 10, 2012

(65) Prior Publication Data

US 2013/0174150 A1 Jul. 4, 2013

(30) Foreign Application Priority Data

Dec. 28, 2011 (JP) ................................ 2011-288106

(51) Int. Cl.
*G06F 15/177* (2006.01)
*G06F 9/455* (2006.01)
*H04N 21/443* (2011.01)

(52) U.S. Cl.
CPC ........ *G06F 9/45558* (2013.01); *G06F 9/45533* (2013.01); *H04N 21/4437* (2013.01); *G06F 2009/45595* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 7,802,000 | B1 * | 9/2010 | Huang et al. ................... | 709/228 |
| 8,725,898 | B1 * | 5/2014 | Vincent .......................... | 709/245 |
| 2004/0083264 | A1 * | 4/2004 | Veselov .......................... | 709/204 |
| 2007/0033260 | A1 | 2/2007 | Grouzdev et al. | |
| 2007/0174429 | A1 | 7/2007 | Mazzaferri et al. | |
| 2007/0234356 | A1 | 10/2007 | Martins et al. | |
| 2008/0222632 | A1 | 9/2008 | Ueno et al. | |
| 2011/0320577 | A1 * | 12/2011 | Bhat et al. ..................... | 709/222 |

FOREIGN PATENT DOCUMENTS

| | | |
|---|---|---|
| JP | 2007-500381 | 1/2007 |
| JP | 2008-225655 | 9/2008 |
| JP | 2008-299791 | 12/2008 |
| JP | 2009-211640 | 9/2009 |
| JP | 2010-045451 | 2/2010 |

OTHER PUBLICATIONS

Protocols.com, TCP/IP Suite, Mar. 24, 2011.*
U.S. Appl. No. 13/608,378, Non Final Office Action, mailed Jun. 3, 2014.
Japanese Patent Application No. 2011-288106, First Office Action, mailed Sep. 30, 2014, (with English Translation).

* cited by examiner

*Primary Examiner* — Lewis A Bullock, Jr.
*Assistant Examiner* — Wynuel Aquino
(74) *Attorney, Agent, or Firm* — Blakely Sokoloff Taylor & Zafman LLP

(57) ABSTRACT

According to one embodiment, an apparatus is configured to carry out a 1st virtual machine and a 2nd virtual machine. The 1st virtual machine includes a notifying module configured to notify a 1st port number to the 2nd virtual machine, and a 1st transmitter configured to transmit, to a network, a 1st packet including a source port number indicating port number other than the 1st port number. The 2nd virtual machine includes a 2nd transmitter configured to transmit, to the network, a 2nd packet including a source port number indicating the 1st port number. The apparatus includes a sorting module configured to sort a received packet to the 1st virtual machine or the 2nd virtual machine.

15 Claims, 22 Drawing Sheets

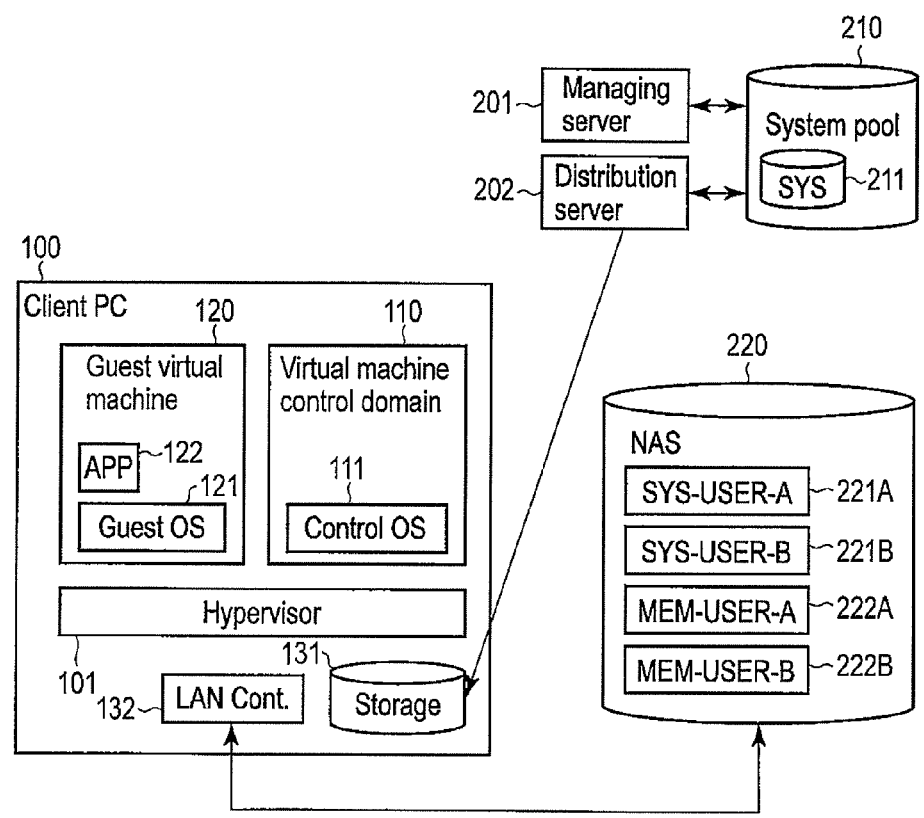
F I G. 1

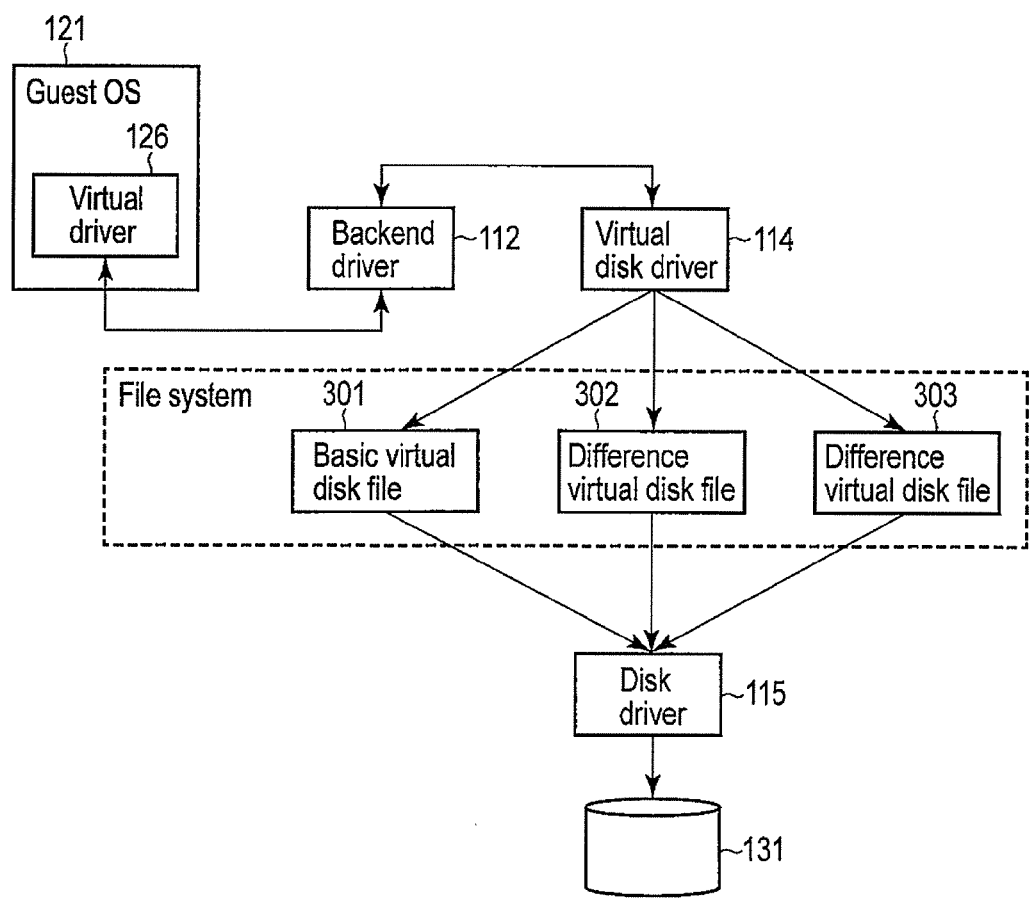
F I G. 3

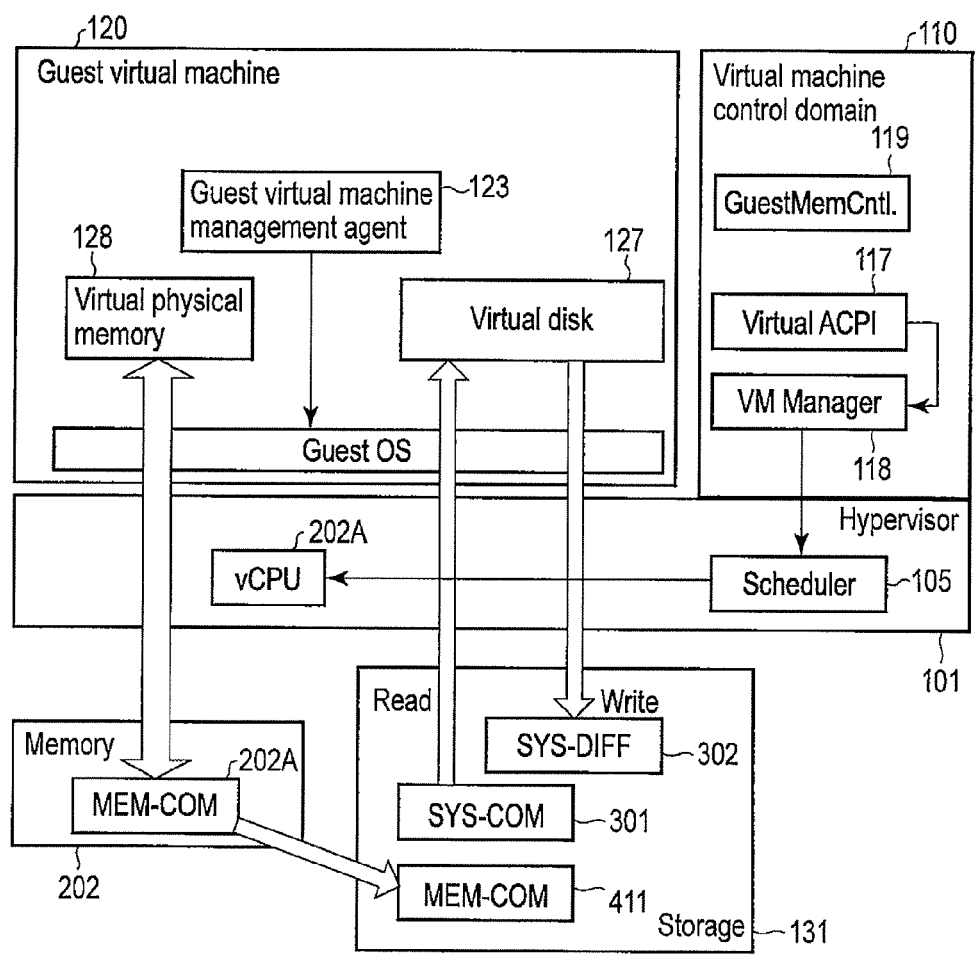
F I G. 5

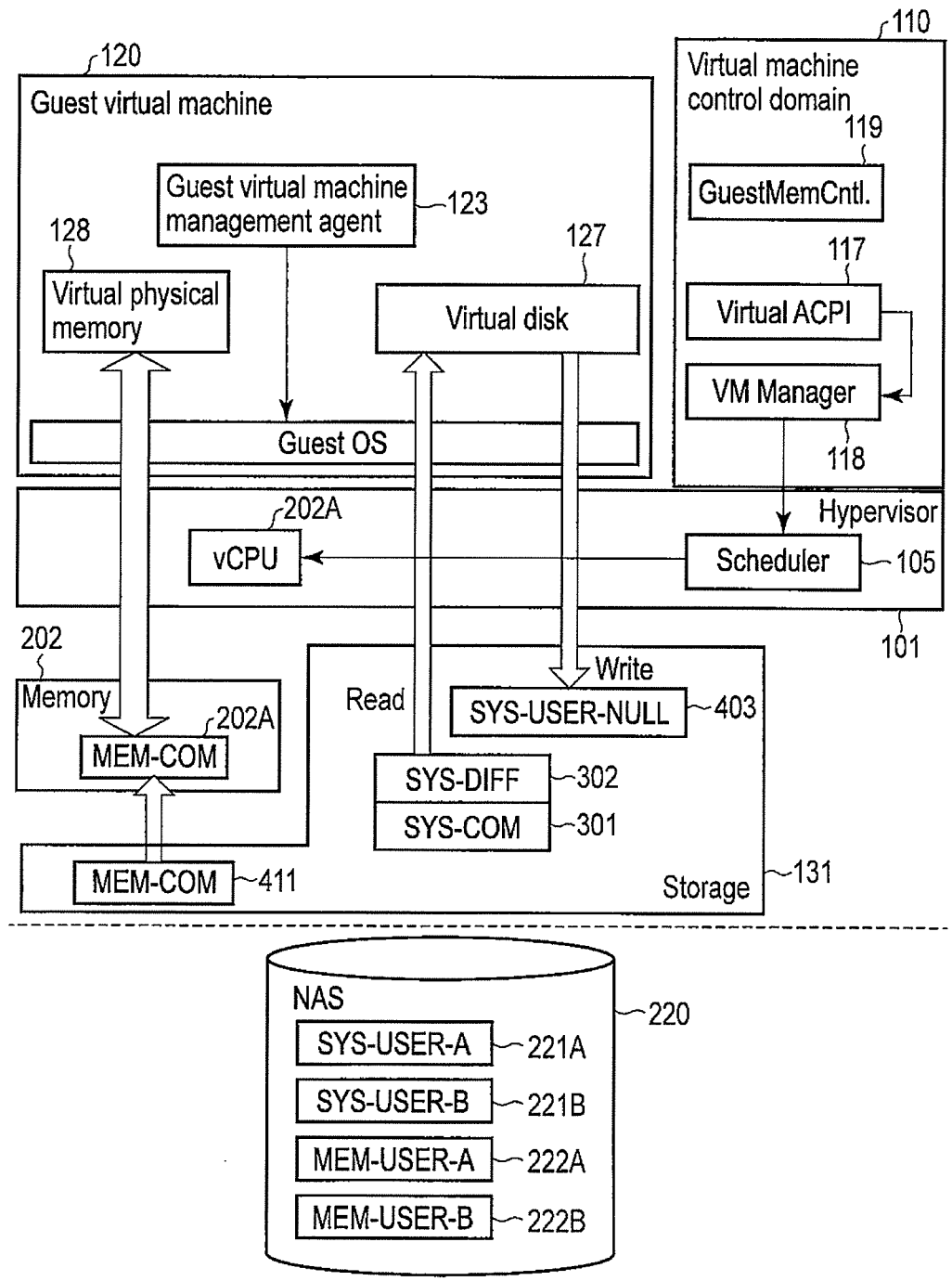
F I G. 6

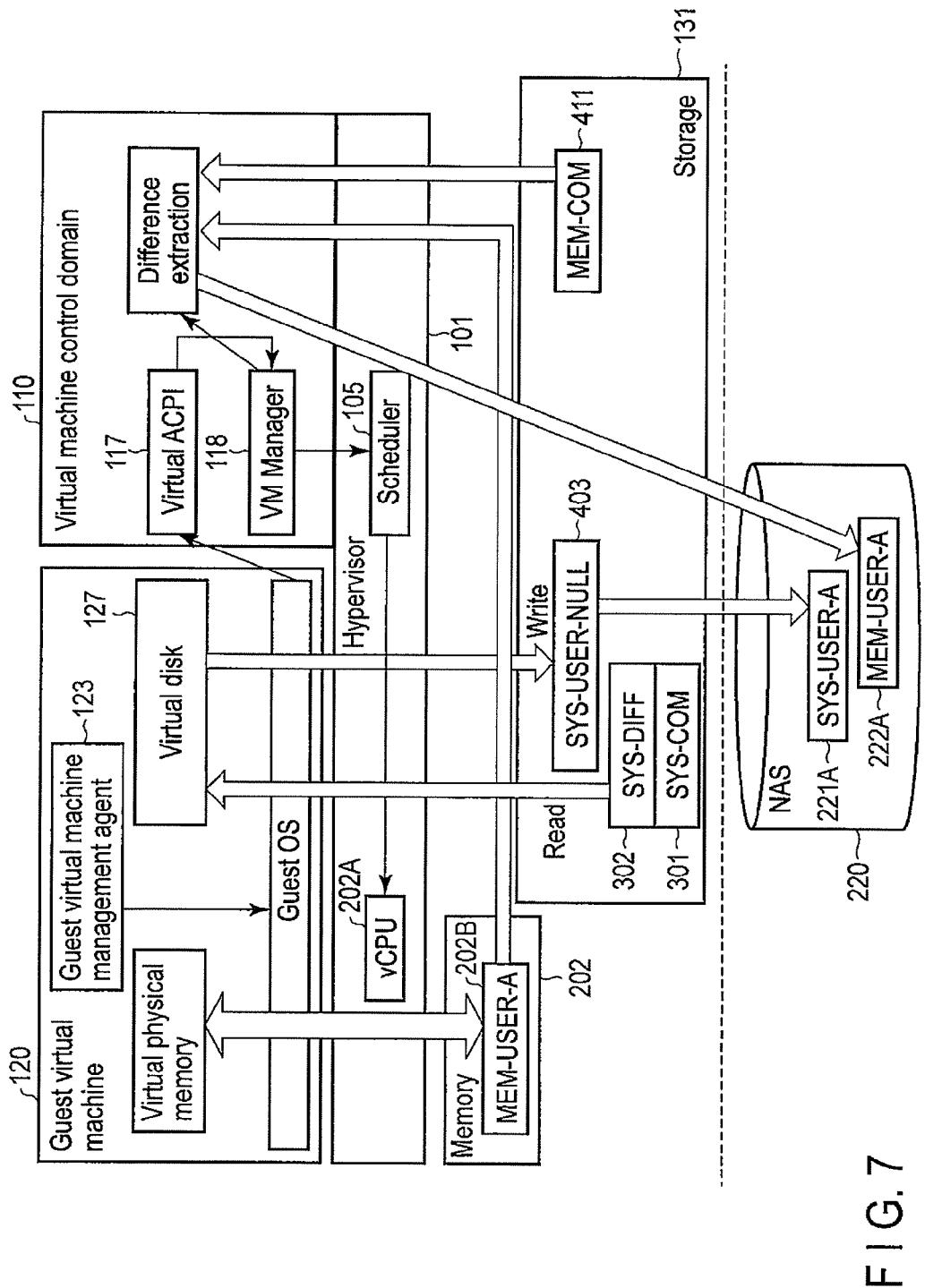
F I G. 7

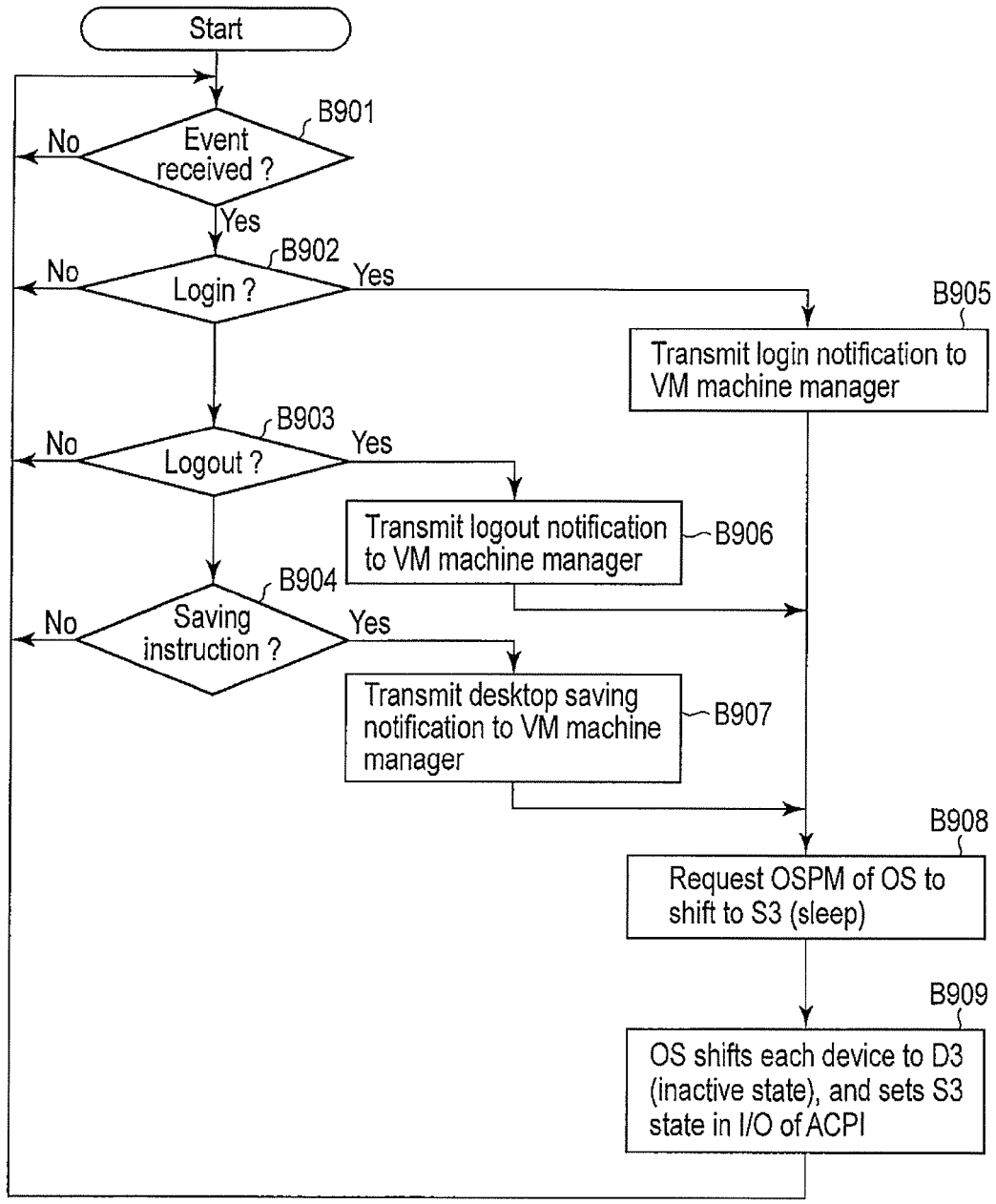
F I G. 13

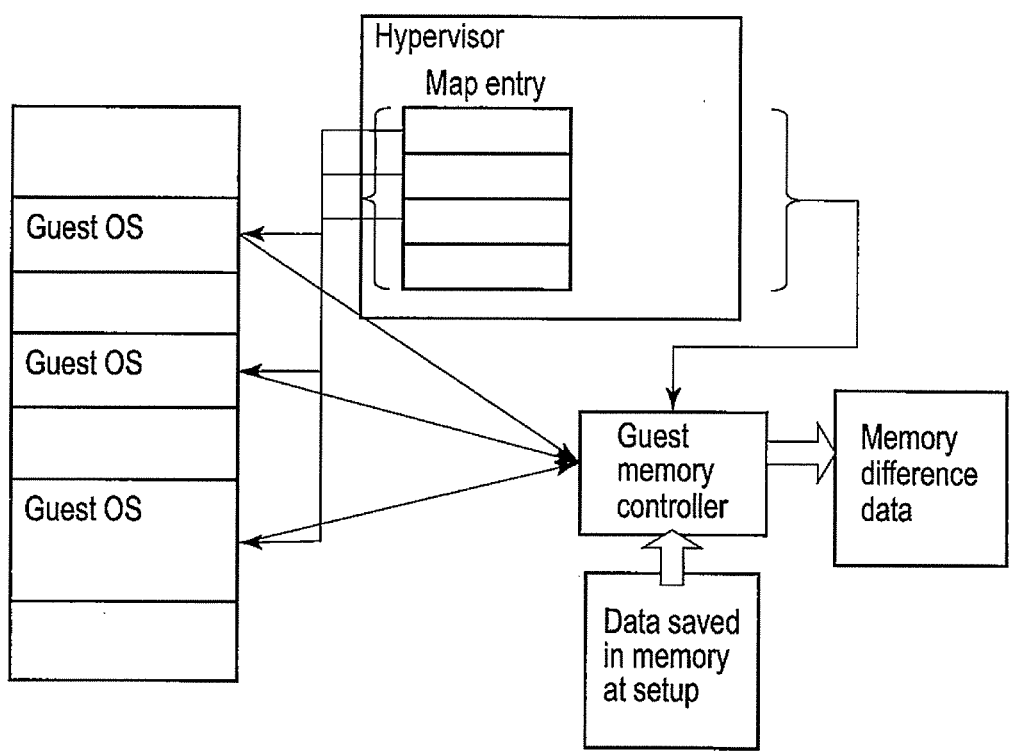
F I G. 14

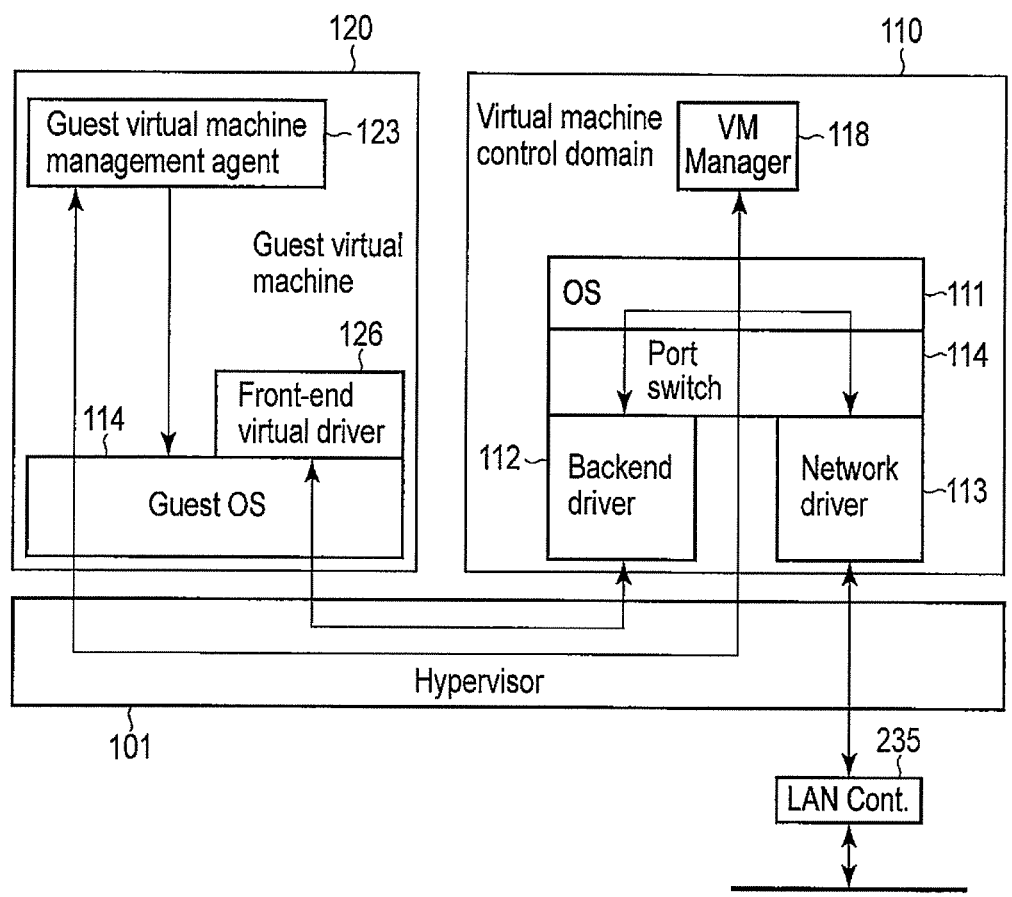
F I G. 1 5

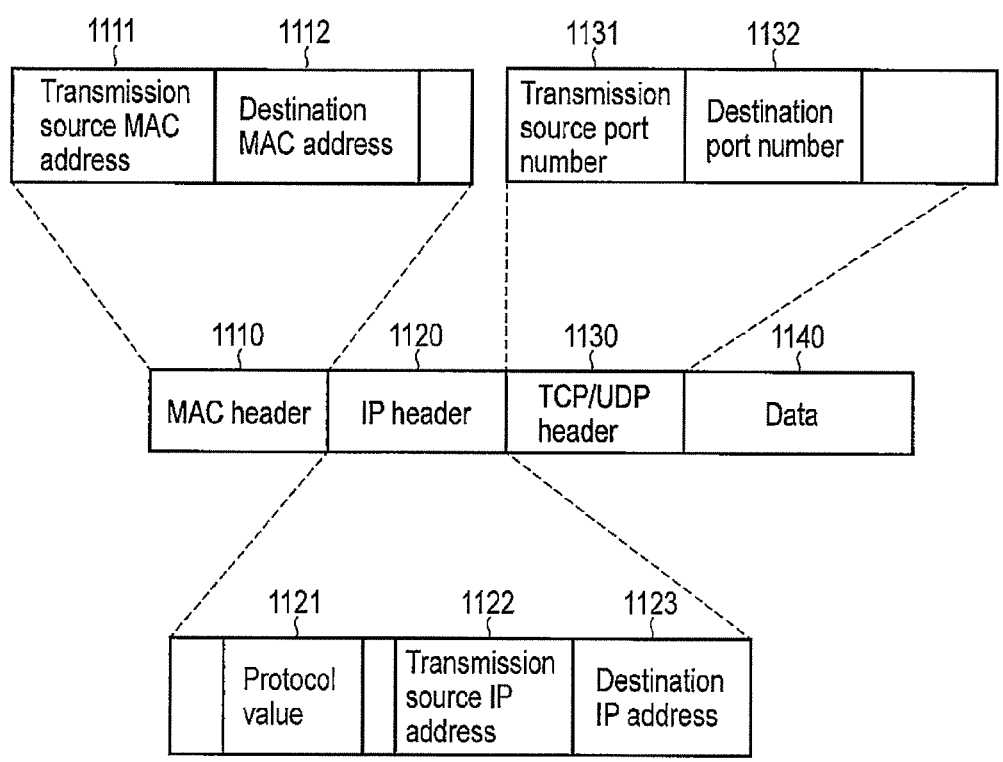
F I G. 16

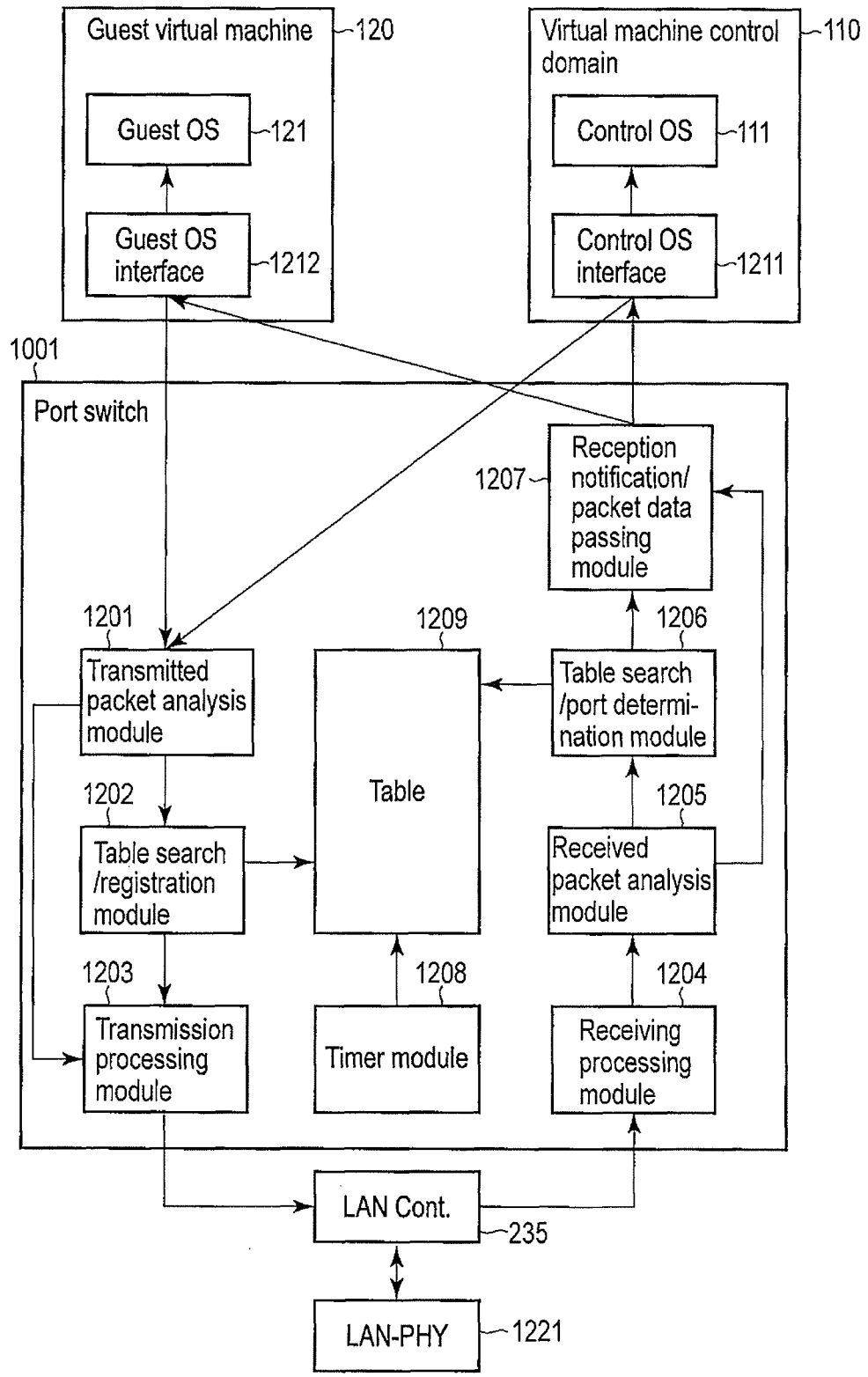
F I G. 17

| Interface number | Port number | Protocol number | Survival time (second) |
|---|---|---|---|
| 0 (control OS) | 100 | 17 | 600 |
| 0 | 101 | 17 | 580 |
| 1 (guest OS) | 100 | 6 | 10 |
| 0 | 22 | 6 | -1 |
| | | | |

F I G. 18

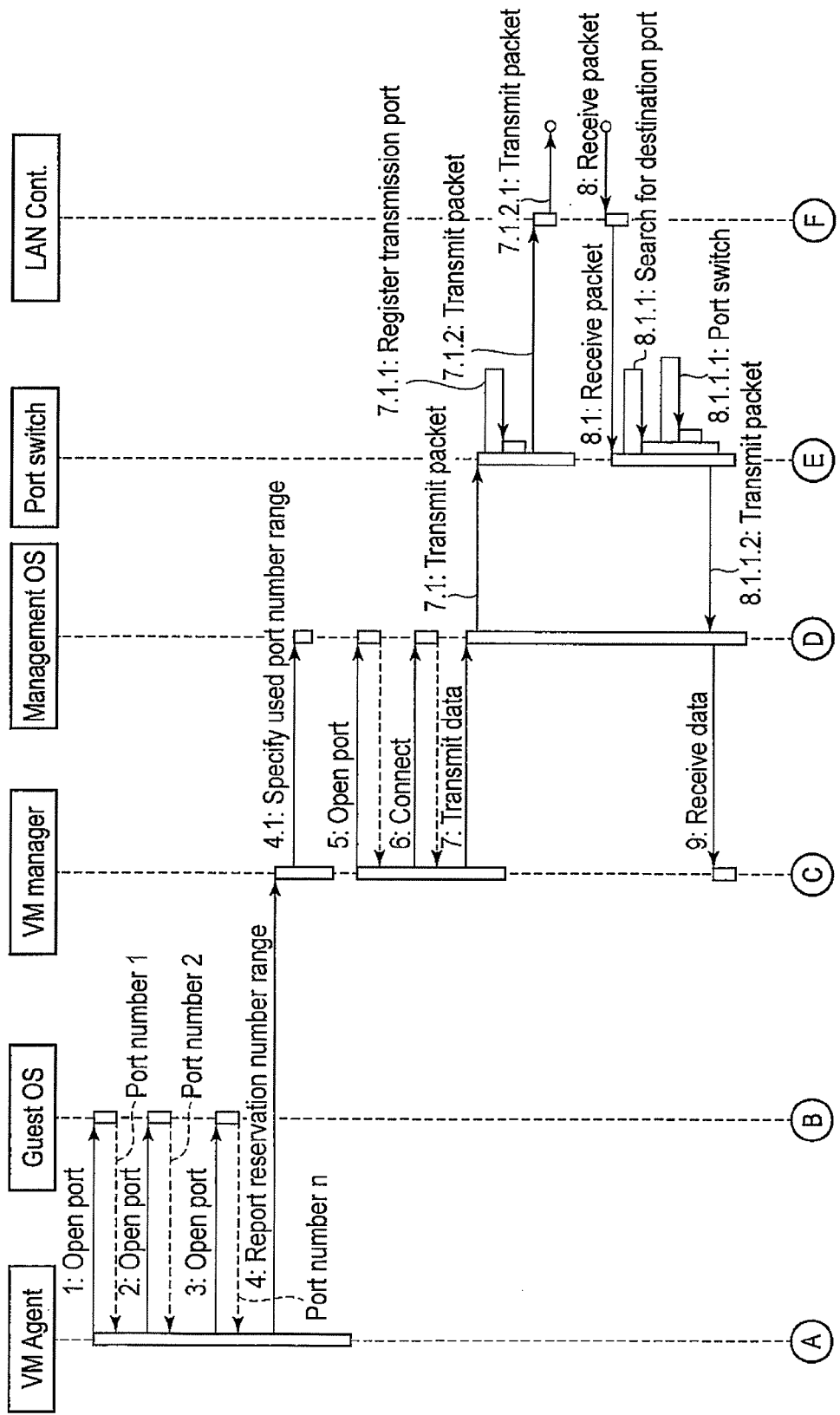
F I G. 21

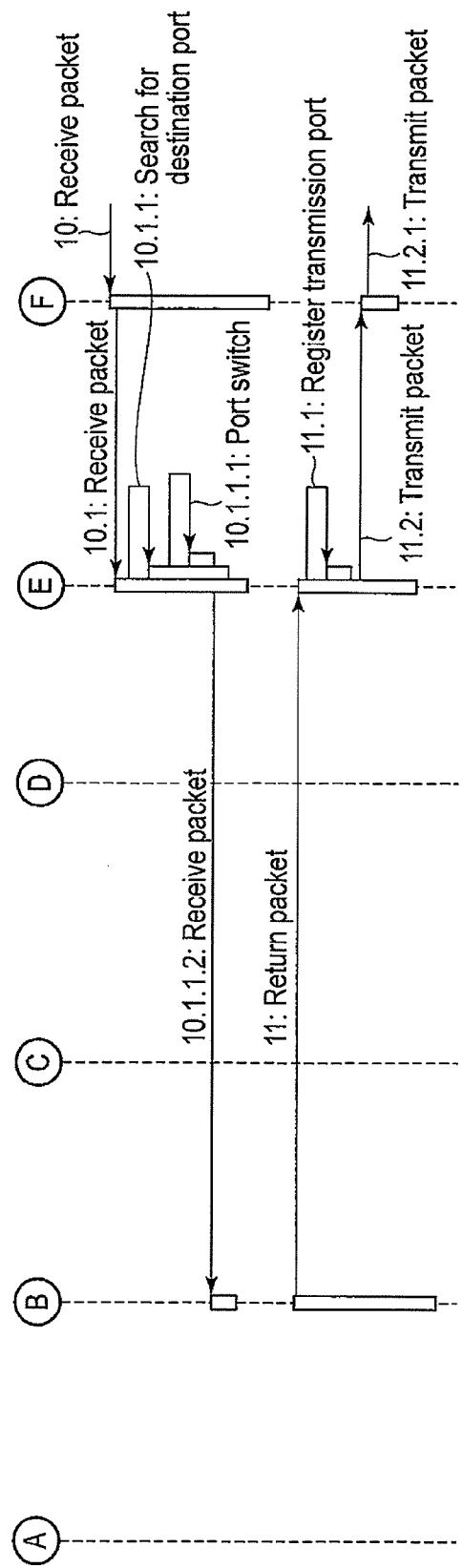
F I G. 22

APPARATUS AND METHOD FOR MANAGING VIRTUAL MACHINE ADDRESSES

CROSS-REFERENCE TO RELATED APPLICATIONS

This application is based upon and claims the benefit of priority from Japanese Patent Application No. 2011-288106, filed Dec. 28, 2011, the entire contents of which are incorporated herein by reference.

FIELD

Embodiments described herein relate generally to a information processing apparatus and a communication control method for carry out a plurality of virtual machines.

BACKGROUND

A conventional computer which carries out a plurality of virtual machines allocates different Media Access Control address (MAC) addresses to virtual LAN interfaces for the respective virtual machines, virtually connects the LAN-interfaces by a virtual bridge or a virtual switch, and sorts the interfaces for transmission/reception ends by the transmission/reception MAC addresses thereamong. When the destination MAC address of a packet received from one physical LAN interface is a broadcast, the packet is received by the LAN interfaces of all the virtual machines. When the destination MAC address is a unicast, the packet is received by the LAN interfaces of the virtual machines having the same MAC address.

In order to set MAC addresses totally different from one another, predetermined MAC addresses are set, or MAC addresses are selected from a specified range and used when MAC addresses are dynamically generated. Therefore, IP addresses that are uniquely determined by the MAC addresses of the respective virtual machines are also different from one another. When a client PC is virtualized, a plurality of MAC addresses and a plurality of IP addresses are required. Thus, a large number of client PCs lead to the shortage of IP addresses.

An address translation scheme provides a plurality of MAC addresses, uses one common representative IP address, and internally allocates and uses local IP addresses. According to this address translation scheme, some protocols are not compatible with the address translation, and there is a limit to network protocols that can be used.

When a plurality of virtual machines are carried out by a computer (information processing apparatus), it is desired to hold down the number of MAC addresses and IP addresses used by the computer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram showing an example of a system configuration according to an embodiment.

FIG. 3 is an exemplary block diagram showing an example of the configuration of a virtual disk.

FIG. 5 is an exemplary diagram used to explain the configuration and operation of the client computer during a setup mode.

FIG. 6 is an exemplary diagram used to explain the configuration and operation of the client computer before login.

FIG. 7 is an exemplary diagram used to explain the configuration and operation of the client computer during user login.

FIG. 13 is an exemplary flowchart showing an example of the operation of a management agent.

FIG. 14 is an exemplary diagram used to explain the generation of difference data for data in a memory.

FIG. 15 is an exemplary diagram showing an example of the flow of packet data in the client computer.

FIG. 16 is an exemplary diagram showing an example of the configuration of a packet flowing in a network.

FIG. 17 is an exemplary diagram showing an example of the configuration of a port switch.

FIG. 18 is an exemplary diagram showing an example of the configuration of a table managed by the port switch.

FIG. 21 is an exemplary sequence diagram showing an example of processing during the transmission/reception of packet data in the client computer.

FIG. 22 is an exemplary sequence diagram showing an example of processing during the transmission/reception of packet data in the client computer.

DETAILED DESCRIPTION

Figure 2:
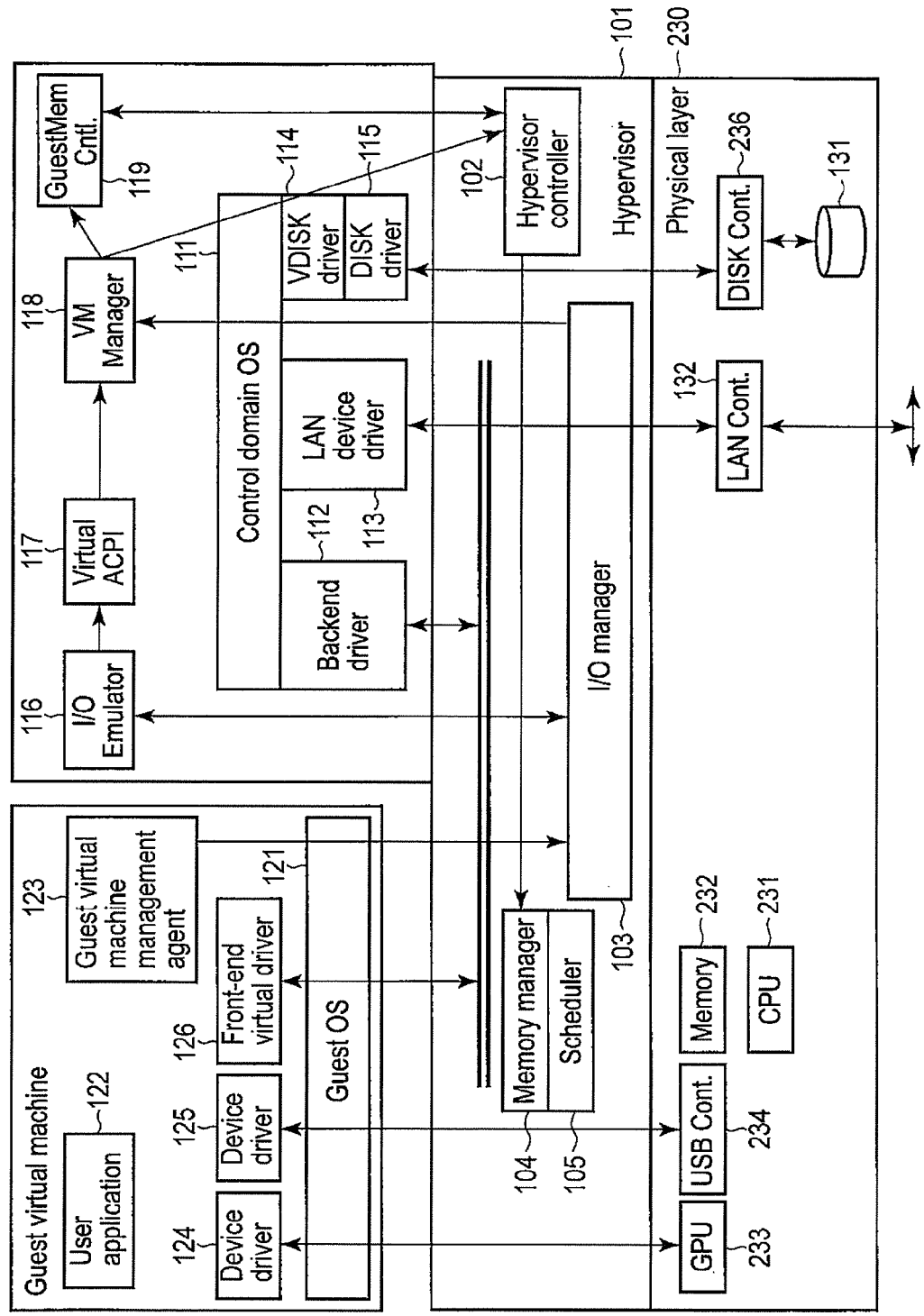
FIG. 2 is an exemplary block diagram showing an example of a software configuration of a client computer.

Various embodiments will be described hereinafter with reference to the accompanying drawings.

In general, according to one embodiment, an information processing apparatus configured to carry out a first virtual machine and a second virtual machine on a hypervisor. The first virtual machine comprises a notifying module and a first transmission module. The notifying module is configured to notify, to the second virtual machine, a first port number allocated by a first operating system in the first virtual machine. The first transmission module is configured to transmit a first transmission packet to a network. The first transmission packet comprises a Media Access Control address (MAC) header, IP header, and a TCP/UDP header. The MAC header comprises a transmission source MAC address indicating a first MAC address. The IP header comprises a protocol value and a destination IP address indicating a protocol of a transport layer. The TCP/UDP header comprises a transmission source port number indicating a port number other than the first port number and a destination port number. The second virtual machine comprises a second transmission module. The second transmission module is configured to transmit a second transmission packet to the network. The second transmission packet comprises a MAC header, an IP header, and a TCP/UDP header. The MAC header comprises a transmission source MAC address indicating the first MAC address. The IP header comprises a protocol value and a destination IP address indicating a protocol of a transport layer. The TCP/UDP header comprises a transmission source port number indicating the first port number. The apparatus comprises a sorting module. The sorting module is configured to sort a received packet to the first virtual machine or the second virtual machine in accordance with a port number indicated by a destination port number in the received packet when the received packet is received via the network. The received packet comprises a MAC header, an IP header, and a TCP/UDP header. The MAC header comprises a destination MAC address indicating the first MAC address. The IP header comprises a protocol value and a destination IP address indicating a protocol of a transport layer. The TCP/UDP header comprises the destination port number.

FIG. 1 is a block diagram showing a system configuration.

A system comprises a client computer (client PC) 100, a management server 201, a distribution server 202, and network attached storage (NAS) 220.

A system pool 210 is connected to the management server 201 and the distribution server 202. Disk image files of guest virtual machines are saved in the system pool 210. The disk image file is transferred to the client computer via the distribution server 202. The management server 201 manages and sets the disk image file corresponding to each client.

In the client computer 100, hardware is virtualized by a hypervisor (virtualizing software) 101, and a plurality of virtual machines operate on the hypervisor 101. In this system, the guest virtual machine (desktop OS, application) and an OS for controlling a virtual machine in a virtual machine control domain operate at the same time.

The disk image file distributed from the distribution server 202 is stored in a storage (HDD or SSD) 131 within the client computer 100. The file server (NAS) 220 is connected to a network which is connected to a LAN controller 132. Data and set values for applications updated by each user are saved in the file server (NAS) 220.

A SYS-USER-A file 221A, a SYS-USER-B file 221B, a MEM-USER-A file 222A, and a MEM-USER-B file 222B are stored in the NAS 220. The SYS-USER-A file 221A and the MEM-USER-A file 222A are files for reproducing the use condition of a user A of a guest virtual machine 120. The SYS-USER-B file 221B and the MEM-USER-B file 222B are files for reproducing the use condition of a user B of the guest virtual machine 120. Depending on the user, the SYS-USER-A file 221A and the MEM-USER-A file 222A or the SYS-USER-B file 221B and the MEM-USER-B file 222B are transferred to the client computer 100.

While there are a number of techniques for virtualizing an I/O device, this apparatus uses a pass-through model to virtualize the I/O device. According to the pass-through model, a virtual machine monitor can directly allocate an I/O device to a virtual machine. For example, an exclusive SCSI card and network card are prepared for each virtual machine, and the SCSI cards and the network cards are allocated to the virtual machines one by one. A device manager performs initialization control of PCI devices.

Now, a software configuration of the client computer 100 is described with reference to FIG. 2.

A virtual machine control domain 110 and the guest virtual machine 120 operate on the hypervisor 101.

The hypervisor 101 adjusts resources of a CPU 231, and distributes the resources of the CPU 231 to the respective domains (the virtual machine control domain and the guest virtual machine) as virtual CPUs in accordance with the scheduling by a scheduler 105. Resources of a memory 202 are allocated to the OSs of the respective domains by a memory manager 104 operating in the hypervisor 101. In the case of a graphics processing unit (GPU) 233, a USB controller (USB cont.) 234, and, for example, audio, USB and IEEE 1394 devices except for a disk controller 236 and the LAN controller 132, a guest OS 121 of the guest virtual machine 120 can directly access the I/O of the device owing to drivers 124 and 125 (pass-through scheme). In the case of the disk controller 236 and the LAN controller 132, the guest OS 121 in the guest virtual machine accesses a backend driver 112 of the virtual machine control domain 110 via a front-end virtual driver 126 (service VM scheme). The backend driver 112 adjusts the access of a control domain OS 111 and the access of the guest OS 121 to access the disk controller 236 and the LAN controller 132. In this case, one disk is seen from the guest OS 121, but the guest OS uses, as a disk, a virtual disk comprising a plurality of virtual disk files (FIG. 3).

FIG. 3 is a block diagram showing an example of the configuration of the virtual disk. For example, as shown in FIG. 3, the virtual disk comprises a basic virtual disk file 301 serving as a master (original), a system difference virtual disk file 302 for storing modified portions in data indicated by the basic virtual disk file 301 and difference information indicating modified data, and a user difference virtual disk file 303. In the present embodiment, the difference virtual disk file is used. For example, written data is stored in the user difference virtual disk file 303.

A guest virtual machine management agent program (hereinafter referred to as a management agent) 123 operating on the guest OS 121 monitors the state of the guest virtual machine 120.

The management agent 123 communicates with a virtual machine manager (VM manager) 118 in the control domain 110 via an I/O manager 103 operating in the hypervisor 101. The virtual machine manager 118 can use a control interface of the hypervisor 101 to issue instructions for the start, end, and sleep recovery of the guest virtual machine 120. A virtual ACPI 117 of the control domain 110 does not directly control an ACPI of the client computer 100 in response to power supply control (ACPI) from the guest OS 121. The virtual ACPI 117 operates only to control power supply in the domain of the guest virtual machine 120. For example, when the guest OS 121 is set to a sleep state, the sleep state is only set on the guest OS 121, while the hypervisor 101 and the control domain OS 111 normally operate.

This client computer 100 has several modes (states). The modes of the client computer 100 are explained below.

1. Distribution image reception mode: the basic virtual disk file 301 and the system difference virtual disk files 302 and 303 are received from the distribution server 202 and then saved in the storage 131 of the client computer 100.

2. Setup mode: the disk image file saved in the storage 131 is started as the guest OS 121 to achieve setup (driver installation and setting) so that the user can log in.

3. Operational mode: the user has logged into the guest OS 121 and is operating the guest OS 121.

4. User switch mode: the user has changed the account and switched the virtual machines.

5. Guest OS mode: the contents of the memory (RAM) used by the environment of the guest OS 121 are saved in the NAS 220.

Figure 4:
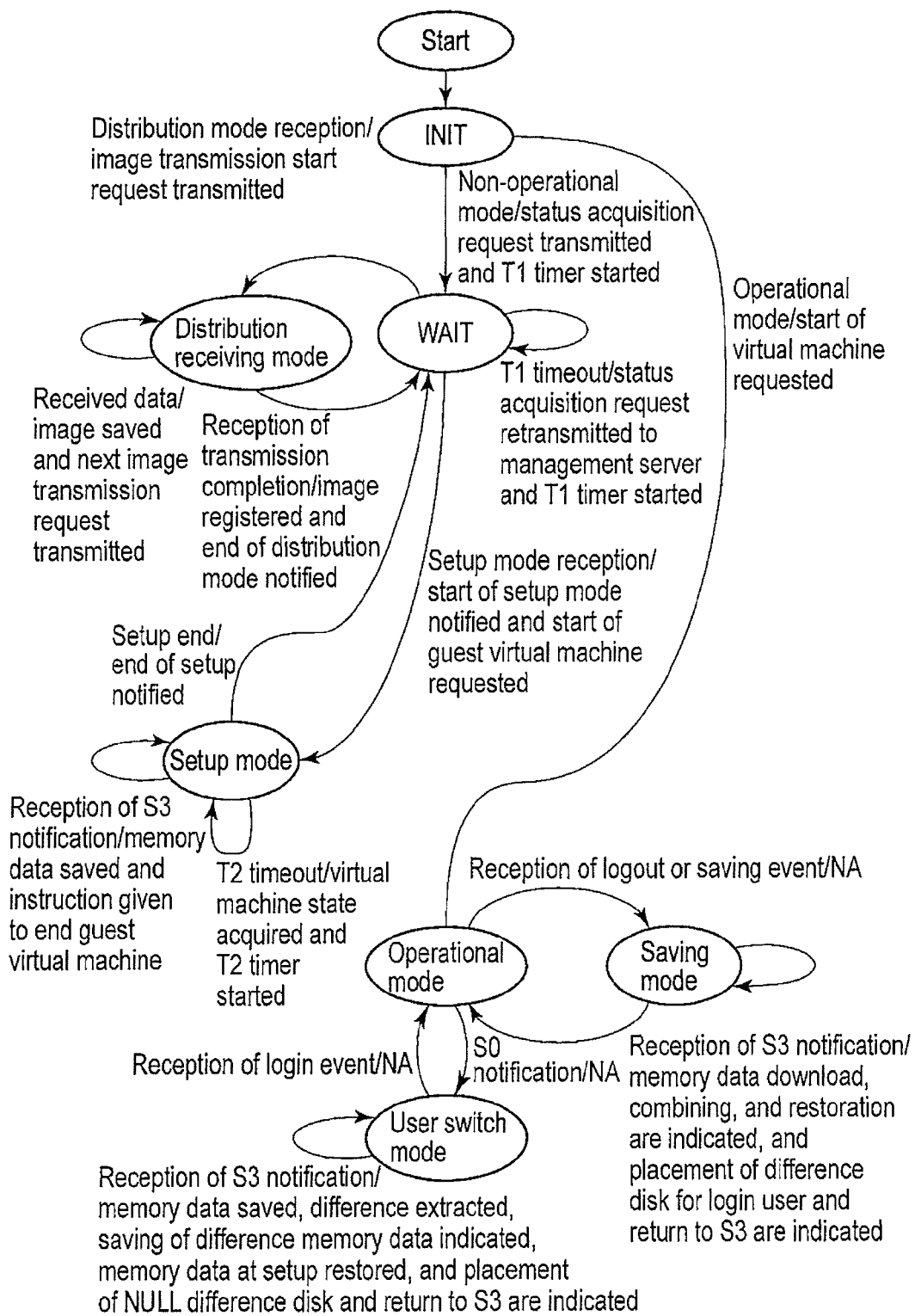
FIG. 4 is an exemplary block diagram showing an example of the state transition of a virtual machine manager.

The transitions of the above-mentioned modes are described with reference to FIG. 4.

The virtual machine manager 118 is in an initial state (INIT) when started. Here, the virtual machine manager 118 enters a waiting state (WAIT) on receipt of the notification of a non-operational mode. During waiting, the virtual machine manager 118 transmits a mode check request to the management server 201. If there is no response from the management server 201 by a T1 time after the transmission, the virtual machine manager 118 again transmits a mode check request to the management server 201.

If the management server 201 indicates the distribution reception mode in response to the mode check request, the virtual machine manager 118 shifts to the "distribution reception mode". The virtual machine manager 118 then transmits an image transmission start request to the distribution server. When receiving data from the distribution server, the virtual machine manager 118 stores an image file in the storage 131. If necessary, the virtual machine manager 118 transmits, to the distribution server, a request to transmit data for storing a next image file in the storage. When notified by the distribution server that the transmission has been completed, the virtual machine manager 118 registers the image file in the hypervisor 101. The virtual machine manager 118 then notifies the end of the distribution reception mode to the management server 201, and enters the waiting state (WAIT). The management server 201 instructs the virtual machine manager 118 to shift to the setup mode.

When the setup mode notification is received from the management server 201, the virtual machine manager 118 shifts to the "setup mode". The virtual machine manager 118 transmits a setup mode start notification to the management server 201. The virtual machine manager 118 issues, to the hypervisor 101, a request to start the guest virtual machine.

In the setup mode, the virtual machine manager 118 checks the setup state of the guest OS every T2 time. Having checked the completion of the setup of the guest OS, the virtual machine manager 118 notifies the completion of the setup to the management server 201, and shuts down the system.

Processing during the setup mode is described with reference to FIG. 5. The basic virtual disk file 301 is distributed to each client computer 100 from the distribution server 202. The same basic virtual disk file (SYS-COM) 301 is saved in the storage 131 of each client computer 100.

After receiving the distribution image, each client computer 100 enters the setup mode. Each client computer 100 reads the basic virtual disk file (SYS-COM) 301 from the storage 131 and then starts the virtual machine. In this case, in a virtual disk 127, one more stage of free system difference virtual disk file (SYS-DIFF) 302 is created in the storage 131 in addition to the distributed basic virtual disk file 301. The difference virtual disk file (SYS-DIFF) 302 is then incorporated into the virtual disk 127. Thus, in writing into the virtual disk 127 from the guest virtual machine, all data is written into the free system difference virtual disk file (SYS-DIFF) 302.

When the guest OS 121 is started, driver installation and network setting are performed because this is the initial start on the client computer 100. Client individual IDs (for example, machine names) are also set. The system difference virtual disk file (SYS-DIFF) 302 is prepared for each client. Data used in the corresponding client is stored in each system difference virtual disk file (SYS-DIFF) 302.

After the end of the setup, the guest virtual machine management agent 123 recognizes the end of the setup. The guest virtual machine management agent 123 notifies the end of the setup to the virtual machine manager 118 of the virtual machine control domain 110. The guest virtual machine management agent 123 then issues a sleep request to the guest OS 121.

The guest OS 121 has a OS-directed power management (OSPM) module compliant with the ACPI. When the guest OS 121 receives a sleep (S3: suspend to RAM) request from the guest virtual machine management agent 123, the OSPM module in the guest OS 121 sets various devices in a physical layer 230 to a D3 state (inactive state) by device drivers corresponding to the above devices.

Having ascertained that all the devices are inactive, the OSPM module outputs an I/O to a virtual BIOS of the guest virtual machine 120 to shift the system to the S3 (sleep). For example, by accessing to a particular I/O address (for example, by issuing an output command to this particular I/O address), the OSPM module instructs the virtual BIOS to shift to the S3 (sleep) state.

In a virtual environment, this I/O (for example, access to the particular I/O address) is acquired by the I/O manager 103 of the hypervisor 101. The I/O manager 103 passes the acquired I/O to an I/O emulator 116 on the control domain OS 111. As the passed I/O is the I/O address of the ACPI, the I/O emulator 116 notifies the passed I/O to the processing of the virtual ACPI. Thus, the virtual machine manager 118 (VM manager) recognizes that the guest virtual machine has shifted to the S3 (sleep) state, and the virtual machine manager 118 instructs a guest memory controller (GuestMemCnt) 119 to save the data in a memory (RAM) 202A used by the guest OS (allocated to the guest virtual machine).

The guest memory controller 119 extracts the memory (RAM) 202A used by the guest OS 121 by the page (4 KB) or by the superpage (2 MB), and saves the memory (RAM) 202A in the storage 131 as an image file (MEM-COM) 411. Thereafter, the virtual machine manager 118 instructs the hypervisor 101 to end the guest virtual machine 120, so that the system is shut down, and the setup ends. At the same time, the completion of the setup mode is notified to the management server 201, and the operational mode is set.

If the operational mode is set after the user has powered on and started the client computer 100 for which the virtualization environment has been set up (INIT), the virtual machine manager 118 enters the "operational mode".

The operational mode is described with reference to FIG. 6. In the operational mode, the client computer 100 starts the hypervisor 101 and starts the control domain OS 111. Further, as shown in FIG. 6, the virtual machine manager 118 starts on the control domain OS 111, and the distributed basic virtual disk file (SYS-COM) 301 and the system difference virtual disk file (SYS-DIFF) 302 saved during setup are allocated to the hypervisor as the virtual disk 127. The virtual machine manager 118 then sets, as the virtual disk 127, a virtual disk file (SYS-USER-NULL) in which no data is stored.

The virtual machine manager 118 instructs the hypervisor 101 to generate a guest domain to start the guest virtual machine. The virtual machine manager 118 then instructs the guest memory controller (GuestMemCntl) 119 to restore data in a guest memory (RAM) allocated to the guest virtual machine 120 on the basis of the MEM-COM file 411 saved at the setup. The hypervisor 101 maps data in the same address used when the MEM-COM file 411 is saved, and allocates a storage area of the memory to the guest virtual machine as the guest memory (RAM) 202A so that the data in the memory can be used from the guest OS. The guest memory controller 119 restores data in the allocated storage area of the memory on the basis of the MEM-COM file 411. After the completion of restoration, the virtual machine manager 118 instructs the guest virtual machine to return to an S0 (conducting operation) state.

As a result, the guest OS 121 returns to the last state of the setup mode, and a login entry screen is displayed on a screen.

The user enters his/her own account ID and password to attempt login. The guest OS 121 performs authentication specified on the basis of the ID and password entered at the time of login, and starts login processing if the authentication is fulfilled.

The guest virtual machine management agent 123 of the guest virtual machine 120 receives this login event, transmits the user ID to the virtual machine manager 118, and instructs the guest OS 121 to immediately enter the S3 (sleep) state. The guest OS 121 sets the devices to the S3 (inactive) state as in setup, and outputs an I/O to shift to the S3 (sleep) state.

Having received information indicating logout or an environment saving event from the management agent 123 during the operational mode, the virtual machine manager 118 enters a saving mode. In the saving mode, if the client computer 100 shifts to the S3 (sleep) state, data in the storage area of the memory allocated to the guest virtual machine is saved in a storage area of the storage 131 allocated to the virtual machine control domain 110. The virtual machine manager 118 extracts a difference between the MEM-COM file 411 and the data in the memory 202A, and generates difference information indicating a modified position and modified data. The virtual machine manager 118 saves the generated difference information in the NAS 220.

The virtual machine manager 118 acquires the SYS-USER-A file 221A from the NAS 220, and compares the difference information included in the SYS-USER-A file 221A with the difference information included in a virtual disk file (SYS-USER-NULL) 403. The virtual machine manager 118 then updates the SYS-USER-A file 221A so that the SYS-USER-A file 221A will include data indicating a new position and data modified from those at the time of the creation of the SYS-USER-A file 221A. Further, the virtual machine manager 118 empties the virtual disk file (SYS-USER-NULL) 403. The virtual machine manager 118 then instructs the guest virtual machine to return to the S0 (conducting operation) state from the S3 state. The virtual machine manager 118 then returns to the "operational mode".

The operation in the saving mode is described with reference to FIG. 7.

If an instruction for saving or logout is detected during login, the guest virtual machine management agent 123 detects the instruction, and sets the guest domain to the S3 (sleep) state. When the guest domain has entered the S3 (sleep) state as shown in FIG. 7, the virtual machine manager 118 then compares the current contents of the RAM (MEM-USER-A file 202B) with the contents during setup (MEM-COM file 411), and obtains a difference by the page or by the superpage. The virtual machine manager 118 saves the difference information indicating a modified position and modified data in the NAS 220 as the MEM-USER-A file 222A, and updates the MEM-USER-A file 222A in the NAS 220. The MEM-USER-B file 222B is saved in the same manner.

The virtual machine manager 118 stores the SYS-USER-NULL file 403 constituting the virtual disk file in the NAS 220 as the SYS-USER-A file 221A, and updates the SYS-USER-A file 221A in the NAS 220.

After the SYS-USER-A file 221A and the MEM-USER-A file 222A have been updated, the virtual machine manager 118 sets the difference disk file (SYS-USER-B) and the difference memory data file (MEM-USER-B) of the user in accordance with the previously mentioned user ID so that these files can be acquired from the NAS 220 on the network.

After receiving a login event from the management agent 123, the virtual machine manager 118 switches to the user switch mode from the operational mode. When the client computer 100 shifts to the S3 (sleep) state, the virtual machine manager 118 receives the basic virtual disk file 301, the system difference virtual disk file 302, and the basic memory image file 411 from the distribution server 202, and receives, from the NAS, the difference memory image file and the user difference virtual disk file that correspond to the user to log in. The virtual machine manager 118 then restores data in a storage area of the memory 202, and stores the image file in the storage 131 of the client computer 100. The virtual machine manager 118 then instructs the guest virtual machine 120 to return to the S0 (conducting operation) state from the S3 state. The virtual machine manager 118 then returns to the "operational mode".

Figure 8:
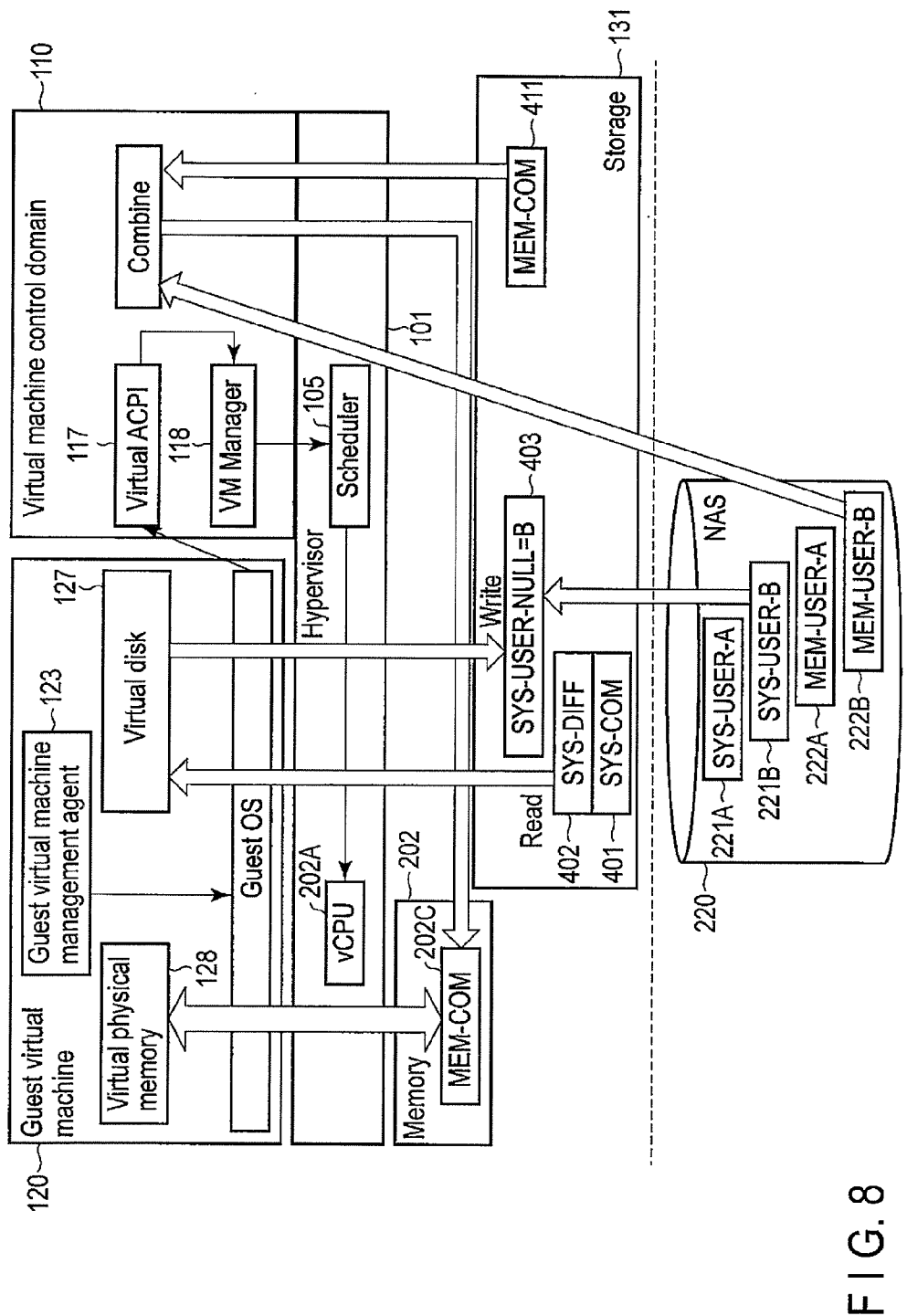
FIG. 8 is an exemplary diagram used to explain the configuration and operation of the client computer during the switch of login users.

Processing during the user switch mode is described with reference to FIG. 8. In the case described below, the use condition of the user B is reproduced.

The virtual machine manager 118 generates data in which the MEM-USER-B file 222B is combined with the MEM-COM file 411 located in the client computer 100. The guest memory controller 119 locates (restores) the generated data in a memory 202C allocated to the guest virtual machine 120. Moreover, the SYS-USER-B file 221B is used as the SYS-USER-NULL file 403. After the restoration, the virtual machine manager 118 instructs the hypervisor 101 to set (return) the domain to the S0 to recover the guest OS.

The screen is changed during login, and the desktop environment for the user B is displayed, and then the user B can start operation.

The operation of switching users after the start of the computer in the operational mode is described with reference to sequence diagrams in FIG. 9 to FIG. 12.

Figure 9:
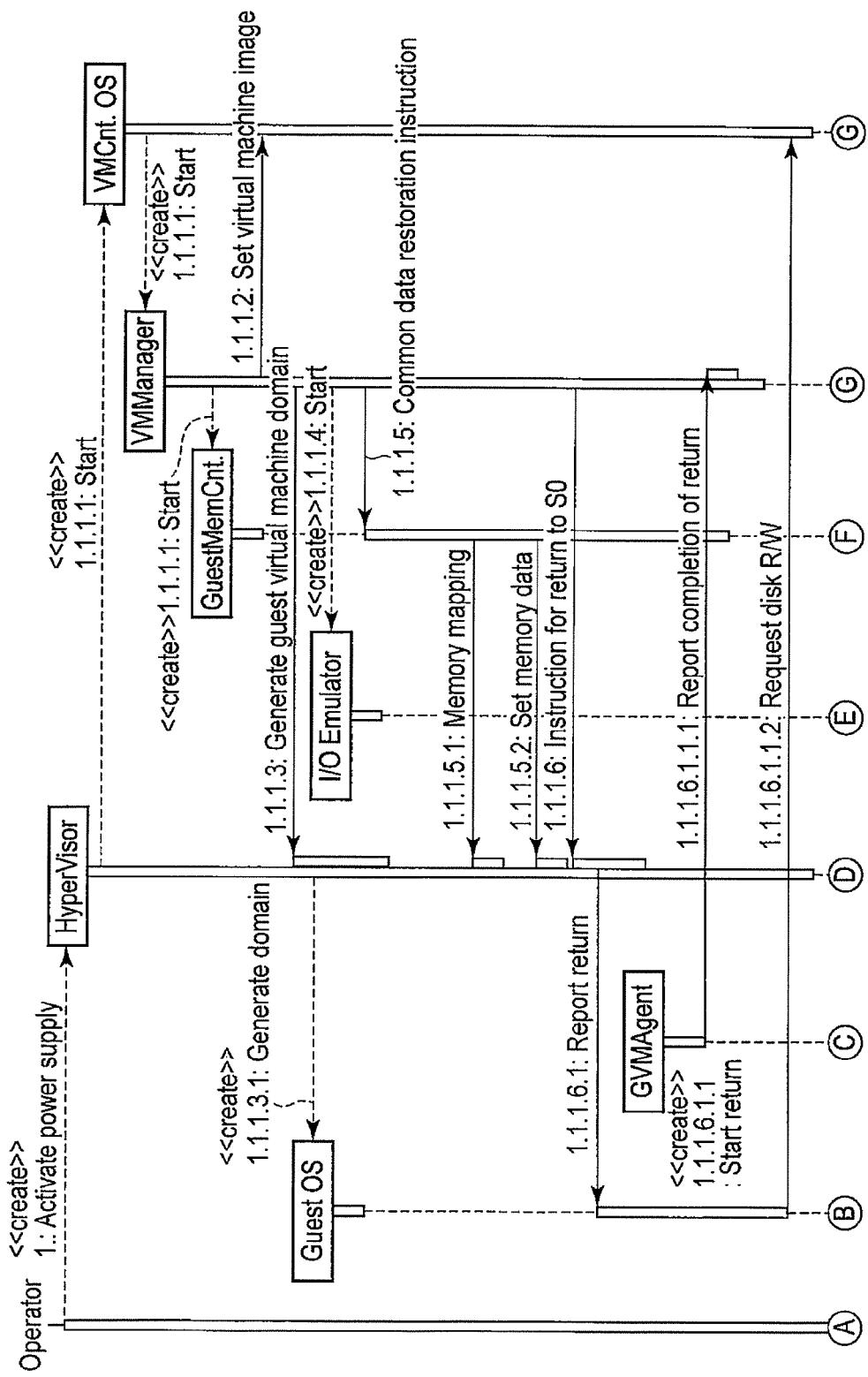
FIG. 9 is an exemplary sequence diagram for explaining the operation of the whole system.

In FIG. 9, when the client computer 100 is powered on, the hypervisor 101 is carried out. The hypervisor 101 starts the VM control domain OS 111 (1.1). The control domain OS 111 starts the virtual machine manager 118. The virtual machine manager 118 starts the guest memory controller 119 (1.1.1). The virtual machine manager 118 refers to the basic virtual disk file 301 and the system difference virtual disk file 302 from the storage 131, and sets, in the control domain OS 111, a virtual disk comprising the basic virtual disk file 301 and the system difference virtual disk file 302 (1.1.1.2). The virtual machine manager 118 instructs the hypervisor 101 to generate a domain for carrying out the virtual machine (1.1.1.3). The hypervisor 101 generates a domain (1.1.1.3.1).

The virtual machine manager 118 starts the I/O emulator 116 (1.1.1.4). The virtual machine manager 118 instructs the guest memory controller 119 to restore data common to the memories 202. The guest memory controller 119 maps the same logical address as that for saving the MEM-COM file 411, to the logical address on a translation table, which is managed by the hypervisor 101, of the physical address of the memory 119 and the logical address of a virtual memory managed by the virtual machine (1.1.1.5.1). The guest memory controller 119 stores data in the memory 202 in accordance with the MEM-COM file 411 (1.1.1.5.2).

The virtual machine manager 118 instructs the hypervisor 101 to return to the S0 state (1.1.1.6). The hypervisor 101 instructs the guest OS 121 to return to the S0 state (1.1.1.6.1). The guest OS 121 starts processing to return to the S0 state (1.1.1.6.1.1). When the guest OS has returned to the S3 state, the management agent 123 notifies the completion of the return processing to the virtual machine manager 118

(1.1.1.6.1.1.1). When accessing the storage 131, the guest OS 121 issues an access request to the backend driver 112 on the VM control domain OS 111 (1.1.1.6.1.1.2). As a result of the processing described so far, the computer is set to the state shown in FIG. 6.

Figure 10:
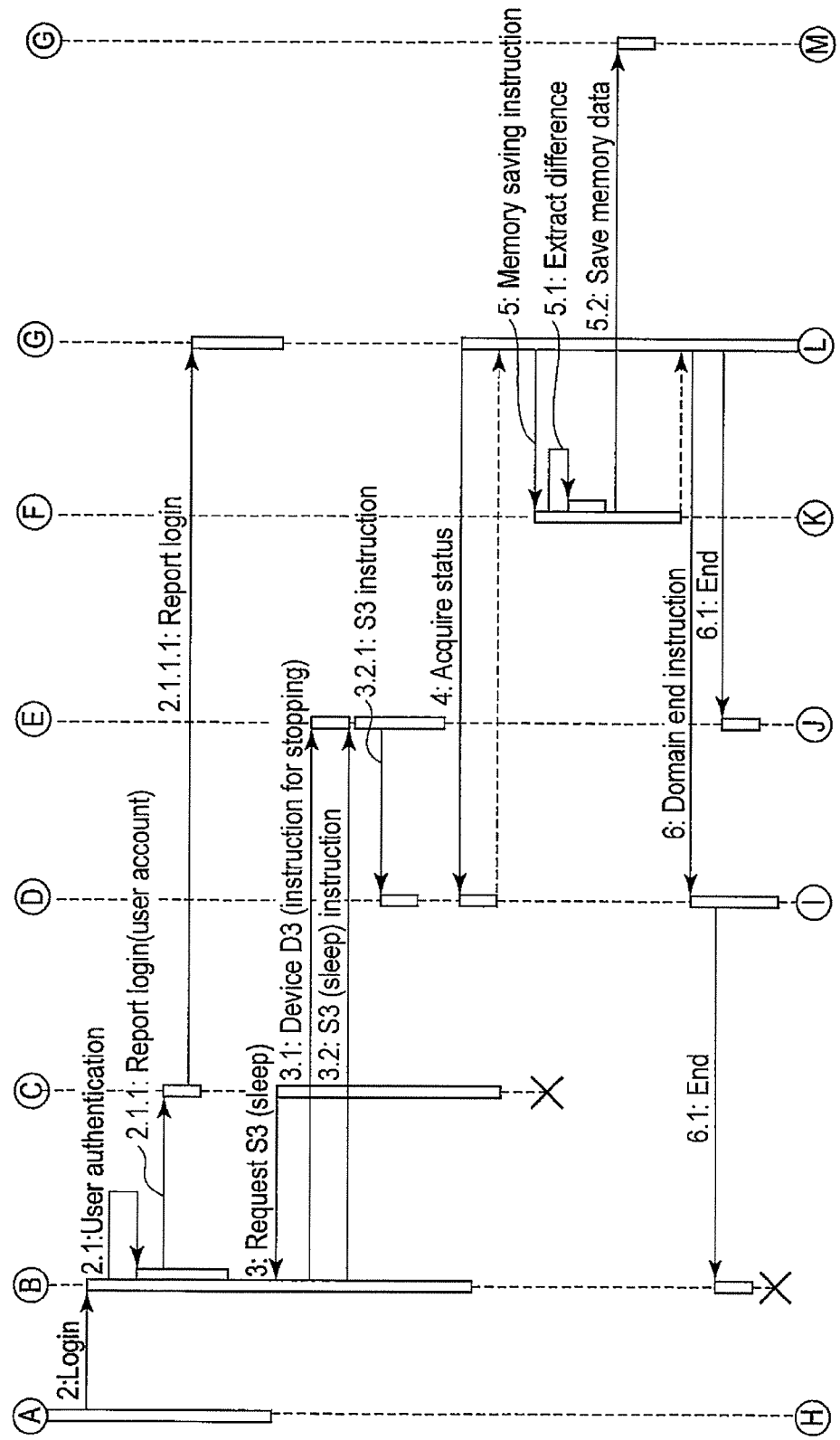
FIG. 10 is an exemplary sequence diagram for explaining the operation of the whole system.

In FIG. 10, if the operator logs in (2), the guest OS 121 performs user authentication (2.1), and notifies the reception of the login event to the management agent 123 (2.1.1). The management agent 123 requests the guest OS 121 to shift to the S3 state (3). The OSPM of the guest OS 121 instructs various I/O devices which have passed through and the I/O emulator 116 to shift to the D3 state (3.1).

Having ascertained that all the devices are inactive, the OSPM of the guest OS 121 outputs an I/O to the virtual BIOS to shift the system to the S3 state. The output to the I/O from the guest OS 121 is acquired by the I/O emulator 116 (3.2). The I/O emulator 116 instructs the hypervisor 101 to shift the domain in which the guest OS 121 is operating to the S3 state (3.2.1).

The virtual machine manager 118 acquires the state of the domain (4). When the domain has shifted to the S3 state, the virtual machine manager 118 instructs the guest memory controller to save data stored in the storage area of the memory allocated to the virtual machine in which the guest OS has been operating (5). As has previously described with reference to FIG. 7, the guest memory controller extracts the difference between the data stored in the storage area of the memory allocated to the virtual machine and the data indicated by the MEM-COM file 411 (5.1). Difference information indicating the extracted difference data and the storage position of the difference data is stored, for example, in the NAS 220 (5.2).

The virtual machine manager 118 instructs the hypervisor 101 to end the domain (6). The hypervisor 101 ends the domain (6.1). The virtual machine manager 118 ends the I/O emulator 116 (7).

Figure 11:
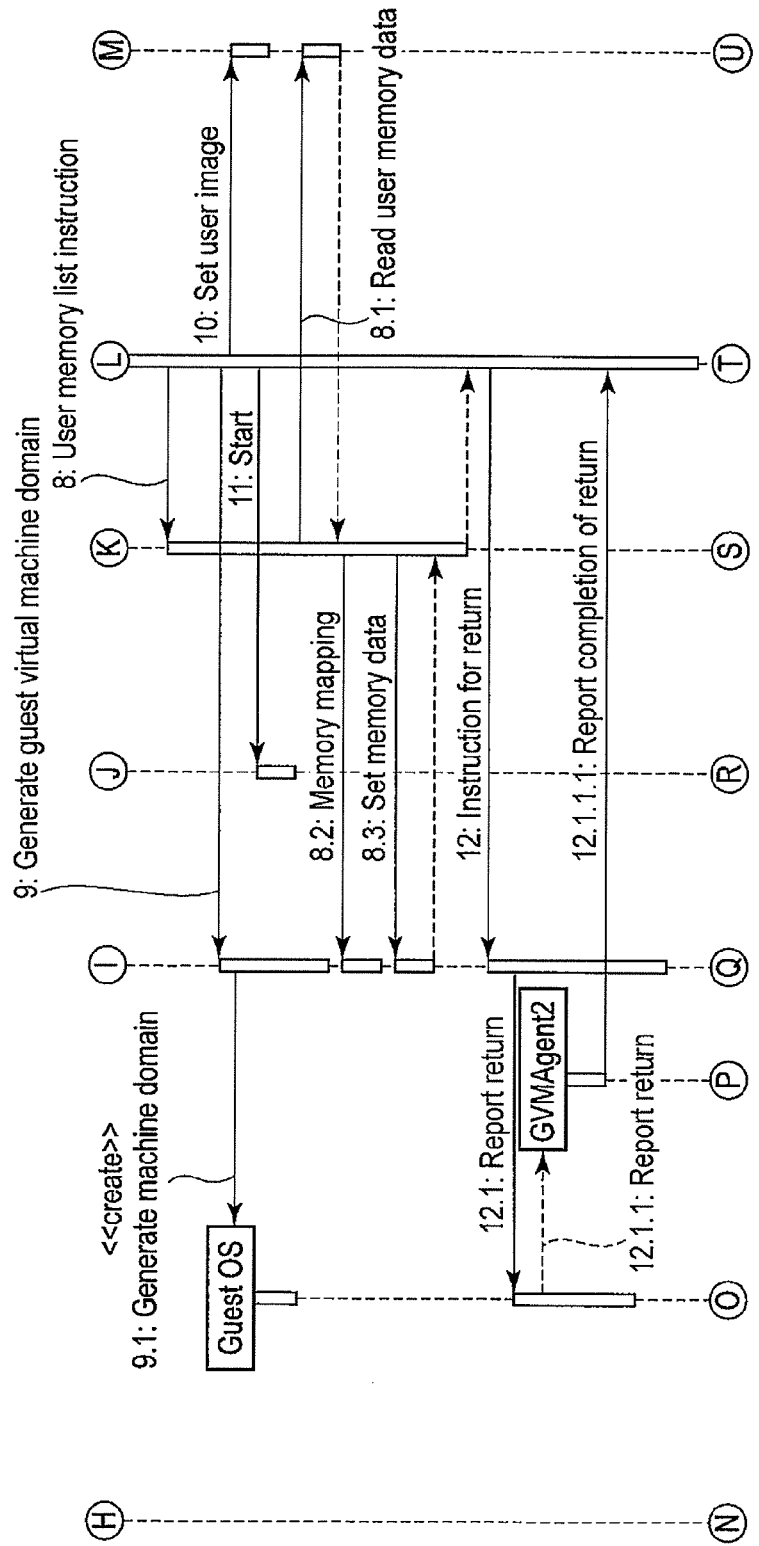
FIG. 11 is an exemplary sequence diagram for explaining the operation of the whole system.

In FIG. 11, the virtual machine manager 118 instructs the guest memory controller to restore the data in the memory by using the MEM-COM file 411 and the MEM-USER file corresponding to the login user (8).

The virtual machine manager 118 instructs the hypervisor 101 to generate a domain for carrying out the virtual machine (9). The hypervisor 101 generates a domain (9.1).

As has previously described with reference to FIG. 8, the virtual machine manager 118 sets the virtual disk for carrying out the guest virtual machine in accordance with the basic virtual disk file 301, the system difference virtual disk file (SYS-DIFF) 302, and the user difference virtual disk file (SYS-USER file) 303, thereby starting the guest virtual machine (10). The virtual machine manager 118 starts the I/O emulator 116 (11).

The guest memory controller 119 issues, to the VM control domain OS 111, a request to read the MEM-COM file 411 and the MEM-USER file corresponding to the login user (8.1). The guest memory controller maps the same logical address as that for saving the MEM-COM file, to the logical address on the translation table, which is managed by the hypervisor 101, of the physical address of the memory and the logical address of the virtual memory managed by the virtual machine (8.2). The guest memory controller stores data in the memory 202 in accordance with the MEM-COM file 411 and the MEM-USER file (8.3).

The virtual machine manager 118 instructs the hypervisor 101 to return the operating system to the S0 state (12). The hypervisor 101 instructs the guest OS 121 to return to the S0 state (12.1). The guest OS 121 starts processing to return to the S0 state (12.1.1). When the guest OS has returned to the S3 state, the management agent 123 notifies the completion of the return processing to the virtual machine manager 118 (12.1.1.1).

Figure 12:
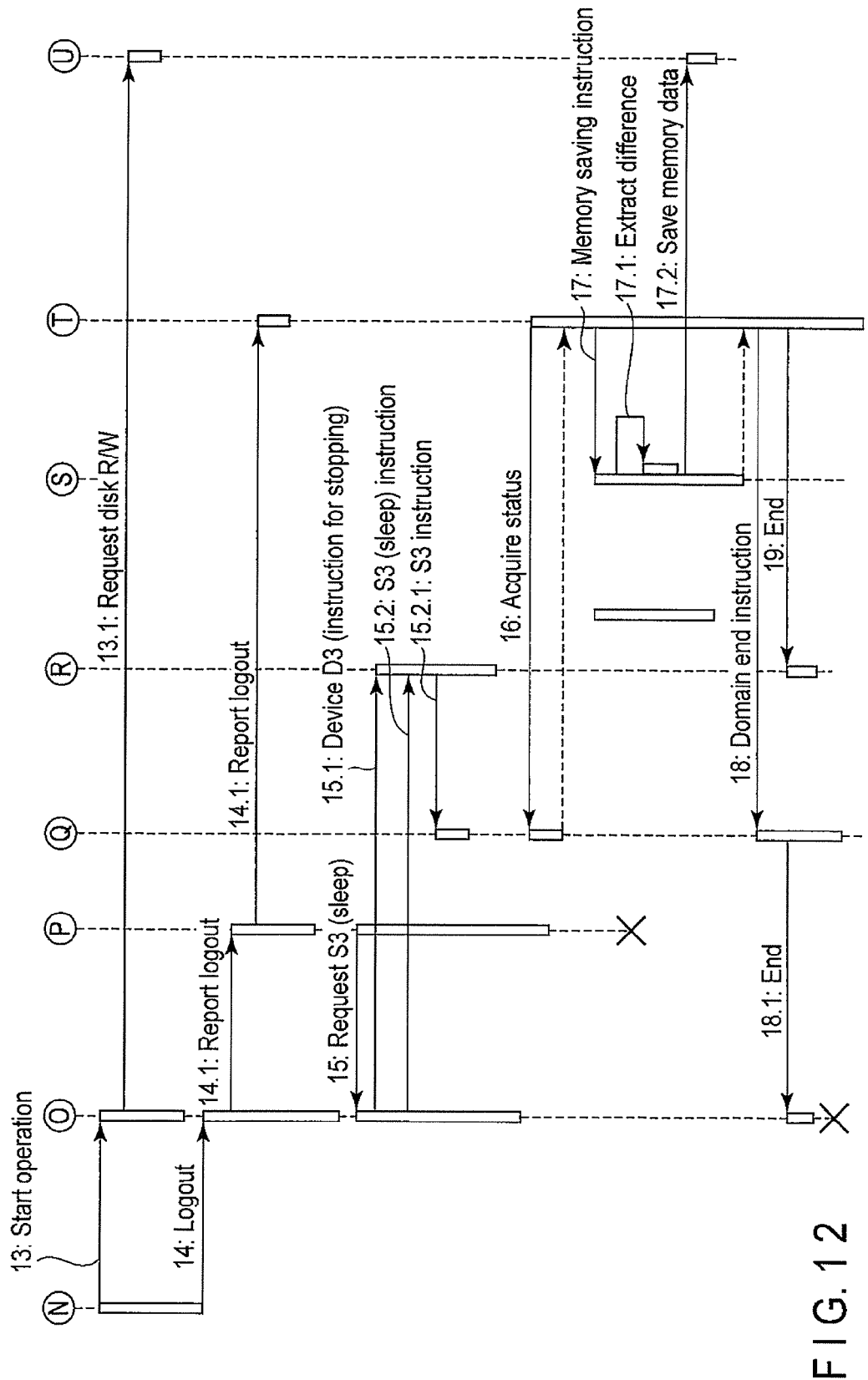
FIG. 12 is an exemplary sequence diagram for explaining the operation of the whole system.

In FIG. 12, after the return to the S0 state, the operator starts operation (13). When accessing the storage, the guest OS issues an access request to the backend driver on the VM control domain OS 111 (13.1).

If the operator performs an operation for logout (14), the guest OS 121 transmits the logout event to the management agent 123. The management agent 123 notifies the reception of the logout event to the virtual machine manager 118. The management agent 123 requests the guest OS to shift to the S3 state (15). The guest OS instructs the I/O emulator 116 to shift to the D3 state (15.1).

Having ascertained that all the devices are inactive, the guest OS 121 outputs an I/O to the virtual BIOS to shift the system to the S3 state. The output to the I/O from the guest OS is acquired by the I/O emulator 116 (15.2). The I/O emulator 116 instructs the hypervisor 101 to shift the domain (guest virtual machine) in which the guest OS is operating to the S3 state (15.2.1).

The virtual machine manager 118 acquires the state of the domain (16). When the domain has shifted to the S3 state, the virtual machine manager 118 instructs the guest memory controller to save data stored in the storage area of the memory allocated to the virtual machine in which the guest OS 121 has been operating (17). The guest memory controller 119 extracts the difference between the data stored in the storage area of the memory allocated to the virtual machine and the data indicated by the MEM-COM file (17.1). The MEM-USER file is updated in accordance with the extracted difference data (17.2).

The virtual machine manager 118 instructs the hypervisor 101 to end the domain (18). The hypervisor 101 ends the domain in response to the instruction from the virtual machine manager 118 (18.1). The virtual machine manager 118 then ends the I/O emulator 116 (19).

Now, the operation of the management agent 123 during the operational mode is described with reference to a flowchart in FIG. 13.

The management agent 123 waits for an event from the guest OS (block B901). On receipt of the event, the management agent 123 determines whether the event is a login event (block B902). When determining that the event is a login event (Yes in block B902), the management agent 123 notifies the reception of the login event to the virtual machine manager 118 (block B905). When determining that the event is not a login event (No in block B902), the management agent 123 determines whether the event is a logout event (block B903). When determining that the event is a logout event (Yes in block B903), the management agent 123 notifies the reception of the logout event to the virtual machine manager 118 (block B906). When determining that the event is not a logout event (No in block B903), the management agent 123 determines whether the event is a desktop environment saving instruction event (block B904). When determining that the event is a desktop environment saving instruction event (Yes in block B904), the management agent 123 notifies the reception of the desktop environment saving instruction event to the virtual machine manager 118 (block B907). After blocks B905, B906, and B907, the management agent 123 requests the OSPM of the operating system to shift to the S3 state (block B908). The operating system shifts each device to the D3 state, and sets the S3 state in the I/O of the ACPI (block B909).

FIG. 14 is a diagram used to explain the generation of memory difference data. When there is one guest virtual machine (except for the control domain OS 111), a memory area used by the guest virtual machine is equal to that during setup. The hypervisor 101 has mapping information (physical addresses and sizes) for divided blocks of the memory area. As the mapping information after user login is in the same state as during setup, a difference can be obtained. In general, there are a memory storage area fixedly used by the guest OS and a memory storage area dynamically used by the applications. The contents in the fixedly used storage area are often not changed. Therefore, the memory volume to be saved decreases by obtaining a difference between these areas during setup.

According to this computer, when the guest OS operating in the guest virtual machine is requested to log out, the guest OS is requested to shift to the sleep state from the normal state. When the guest OS has shifted to the sleep state, a memory image file indicating the data in the storage area of the memory used by the guest OS is created. When the start of the guest virtual machine is requested, a disk image file indicating the data in the storage area of the storage device allocated to the virtual machine during the creation of the memory image file is set in the hypervisor. In accordance with the memory image file, data stored in a first storage area is restored in a second storage area of the memory allocated to the virtual machine. When the data is restored in the second storage area, the hypervisor is requested to return the operating system to the normal state from the sleep state. As a result, during the startup of the guest virtual machine or during the switch of login users, it is possible to reduce the time for waiting the guest virtual machine to be available.

In the meantime, the above-mentioned management agent 123 operating on the guest OS in FIG. 2 monitors the state of the guest virtual machine 120. The management agent 123 can communicate with the virtual machine manager in the control domain via the I/O manager of the hypervisor 101. At startup, the management agent 123 requests the guest OS 121 to open a predetermined number of communication ports. In response to the request, the management agent 123 notifies the port number of a port allocated from the guest OS 121 to the virtual machine manager 118 operating on the control domain OS 111. The virtual machine manager 118 requests the control domain OS 111 to use the notified port number as a transmission source port number. In response to the request, the control domain OS 111 limits the transmission source port number.

FIG. 15 shows the flow of packet data in the client computer. A network driver 113 of the control domain 110 performs the reception processing of the packet received by a LAN controller 235. The received packet is sent to a port switch 1001 in the control domain OS 111. The port switch 1001 determines whether the packet is a received packet in the guest virtual machine 120. When the port switch 1001 determines that the packet is a received packet in the guest virtual machine 120, the packet is transmitted to the front-end virtual driver 126 in the guest virtual machine 120 via the backend driver 112 and the hypervisor 101. The packet received by the front-end virtual driver 126 is processed by the guest OS 121, and data is passed to the application in the guest virtual machine.

On the other hand, the packet transmitted from the guest virtual machine 120 is passed to the backend driver 112 of the control domain OS 111 via the front-end virtual driver 126 in the guest virtual machine 120 and the hypervisor 101. The packet is then transmitted to a device on the actual network via the port switch 1001 of the control domain OS 111.

FIG. 16 shows the configuration of a packet flowing in the network. This packet is regulated by a IEEE802.3 Media Access Control address (MAC) header used by the LAN and a TCP/IP protocol, and the protocol of a transport layer is a TCP/UDP. The packet includes, for example, a MAC header 1110, an IP header 1120, a TCP/UDP header 1130, and data 1140.

The MAC header 1110 includes, for example, a transmission source MAC address 1111, and a destination MAC address. The IP header 1120 includes, for example, a protocol number 1121 indicating the protocol of the transport layer, a transmission source IP address 1122, and a destination IP address 1113. The TCP/UDP header 1130 includes, for example, a transmission source port number 1131 and a destination port address 1132.

Now, the configuration of the port switch 1001 is described with reference to FIG. 17. The port switch 1001 has a transmitted packet analysis module 1201, a table search/registration module 1202, a transmission processing module 1203, a reception processing module 1204, a received packet analysis module 1205, a table search/port determination module 1206, a reception report/packet data passing module 1207, and a timer module 1208.

The control domain 110 and the guest virtual machine 120 have a control domain OS interface 1211 and a guest OS interface 1212 as virtual LAN interfaces, respectively. The transmitted packets from the LAN interfaces 1211 and 1212 are sent to the transmitted packet analysis module 1201.

The port switch 1001 manages a table 1209. The structure of the table 1209 is described with reference to FIG. 18. The LAN interface number of the virtual machine is input to an interface number (integer of zero or greater). A transmission source port number (SP) is input to the port number at the time of packet transmission. At the time of packet reception, the correspondence between a destination port number (DP) and the transmission source port number (SP) is checked. A protocol number at the time of packet transmission is input to the protocol number. At the time of packet reception, a protocol number at the time of packet transmission corresponding to the reception protocol number is searched for.

The survival time of each entry is subtracted by the timer module 1208 at regular time intervals, and the entry is invalidated and deleted when the survival time has reached zero. The entry having an initial value of the survival time of −1 is not subtracted by the timer module 1208 and remains being invalidated. This is because the packet which previously has this port number as the destination port number (DP) is received. Normally, each entry is registered by starting a communication from the client side. However, when a communication is started from the outside of the client, the control domain OS side cannot receive the entry by the port switch 1001. Therefore, the entry which previously has a survival time of −1 is set to ensure that this entry always remains. This permits a normal communication even when a communication is started from the outside of the client.

The transmitted packet analysis module 1201 determines whether the packet is a TCP/IP packet. If the packet is a TCP/IP packet, the table search/registration module 1202 extracts the protocol number, the transmission source port number (SP), and the destination port number (DP). The table search/registration module 1202 searches the table 1209 for an entry corresponding to the extracted protocol number and transmission source port number (SP). If the packet is a packet other than the TCP/IP packet, the packet analysis unit passes the packet to the transmission processing module 1203 without searching the entries in the table 1209.

If there is no entry corresponding to the extracted protocol number and transmission source port number (SP), the table search/registration module 1202 registers the protocol number, the transmission source port number (SP), and the received virtual LAN interface number in a new entry. If there is already an entry in the table 1209, the table search/registration module 1202 resets the survival time of this entry to a default value, and passes the packet to the transmission processing module 1203. The transmission processing module 1203 performs transmission processing to transmit the packet to the LAN controller 235. The LAN controller 235 transmits data to the device located on the network connected to a LAN port (LAN-PHY) 1221.

Now, the reception of data is described. The data transmitted from the device located on the network connected to a LAN port (LAN-PHY) 1221 to which a network cable is connected is received by the LAN controller 235. The LAN controller 235 passes the received packet to the reception processing module 1204. The reception processing module 1204 extracts a packet from the data. If the extracted packet is a TCP/IP packet, the received packet analysis module 1205 extracts the protocol number, the transmission source port number (SP), and the destination port number (DP). The table search/port determination module 1206 searches for an entry corresponding to the protocol number and the destination port number (DP) extracted from the table 1209. If there is a corresponding entry in the table 1209, the table search/port determination module 1206 instructs the reception report/packet data passing module 1207 to notify the reception to the LAN interface of the port number of the entry. If there is no corresponding entry, the table search/port determination module 1206 instructs the reception report/packet data passing module 1207 to notify the reception to the LAN interface of the guest virtual machine and to pass the packet data. If the received packet is a packet other than the TCP/IP packet, the reception report/packet data passing module 1207 causes this packet to be received by the guest OS interface 1212 of the guest virtual machine. In particular, if the packet is an address resolution protocol (ARP) packet (a protocol that associates the IP address with the MAC address), this packet is received by the reception report/packet data passing module 1207. Thus, a proper port number enables the packet to be received by the LAN interface of the proper virtual machine even if the LAN interfaces have the same MAC address and IP address. The timer module 1208 subtracts the survival time of each entry on the table 1209 at regular time intervals, and deletes the entry when the survival time has reached zero.

Figure 19:
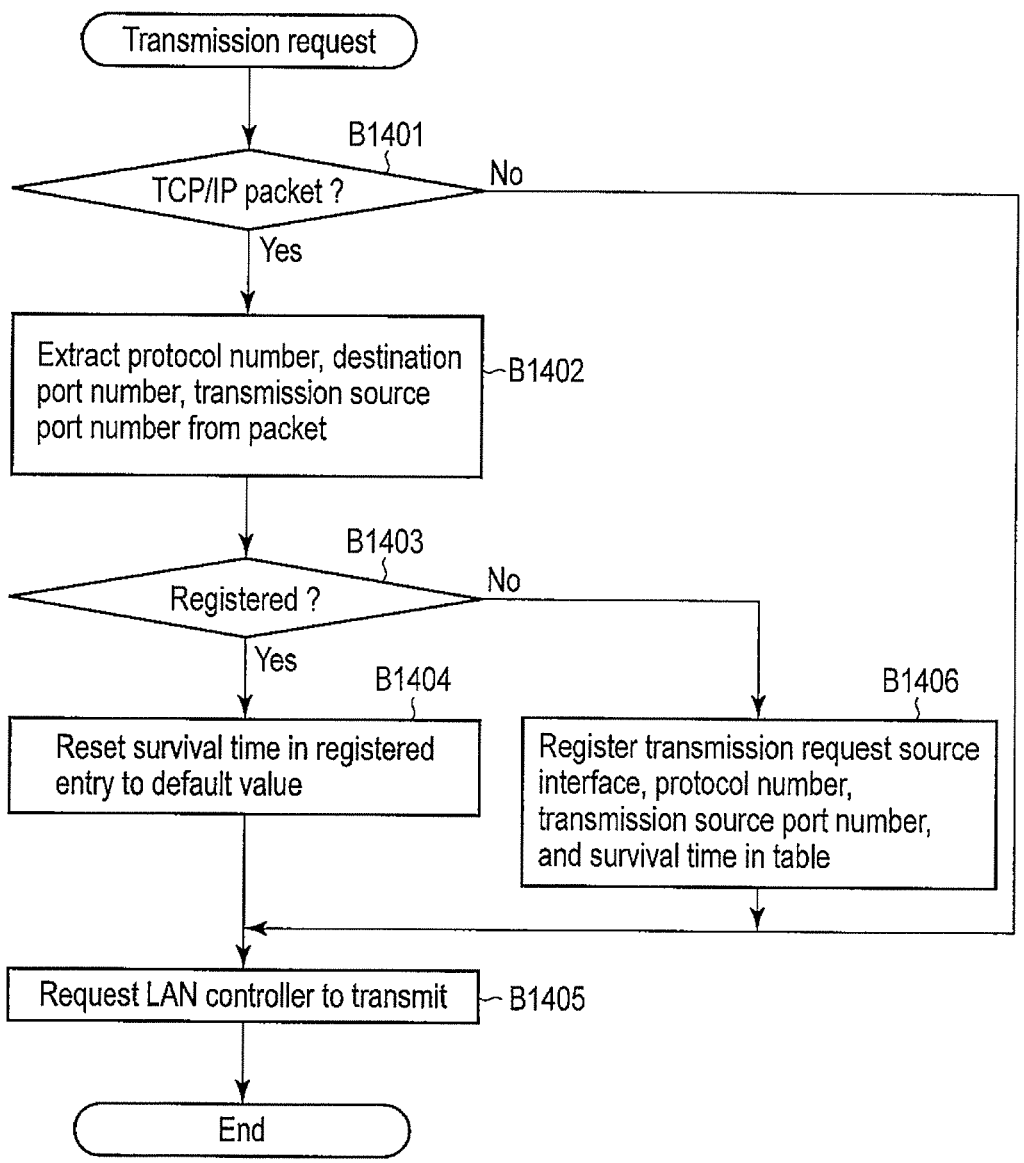
FIG. 19 is an exemplary flowchart showing an example of the operation of the port switch during packet transmission.

The operation of the port switch 1001 during packet transmission is described with reference to a flowchart in FIG. 19.

The transmitted packet analysis module 1201 determines whether the packet to be transmitted is a TCP/IP packet (block B1401). When the packet is determined to be a TCP/IP packet (Yes in block B1401), the table search/registration module 1202 extracts the protocol number, the transmission source port number (SP), and the destination port number (DP) from the packet (block B1402). The table search/registration module 1202 determines whether an entry having the virtual LAN interface number, the protocol number, and the transmission source port number (SP) of the transmission request source is registered in the table 1209 (block B1403).

When such an entry is determined to be registered (Yes in block B1403), the survival time in the registered entry is set to a default value (block B1404).

When no such entry is determined to be registered (No in block B1403), the table search/registration module 1202 sets, in the table 1209, an entry having the virtual LAN interface number, the protocol number, the transmission source port number (SP), and the survival time of the transmission request source (block B1406).

When the packet is determined not to be a TCP/IP packet (No in block B1401) and after blocks B1404 and B1405, the transmission processing module 1203 requests the LAN controller to transmit the packet (block B1405).

Figure 20:
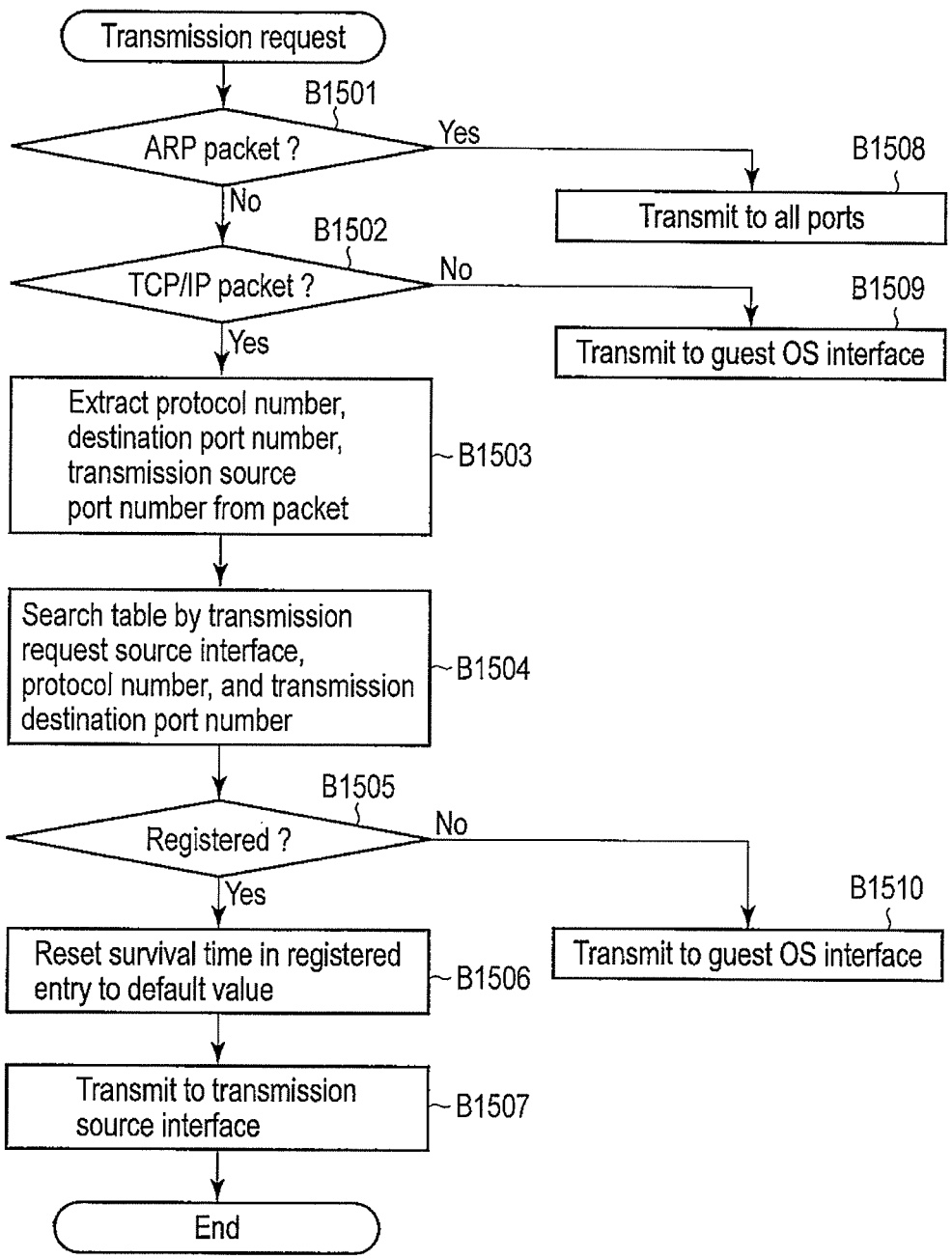
FIG. 20 is an exemplary flowchart showing an example of the operation of the port switch during packet reception.

Now, the operation of the port switch 1001 during packet reception is described with reference to FIG. 20.

The received packet analysis module 1205 determines whether a received packet is an ARP packet (block B1501). When the packet is determined to be an ARP packet (Yes in block B1501), the reception report/packet data passing module 1207 passes the packet to all the ports (block B1508). When the packet is determined not to be an ARP packet (No in block B1501), the received packet analysis module 1205 determines whether the packet is a TCP/IP packet (block B1502). When the packet is determined not to be a TCP/IP packet (No in block B1502), the reception report/packet data passing module 1207 passes the packet to the guest OS interface 1212 (block B1509).

When the packet is determined to be a TCP/IP packet (Yes in block B1503), the table search/port determination module 1206 extracts the protocol number, the transmission source port number (SP), and the destination port number (DP) from the packet (block B1503). The table search/registration module 1202 searches the table 1209 for an entry having the protocol number and the destination port number (DP) (block B1504).

If no registered entry is found as a result of the search (No in block B1505), the reception report/packet data passing module 1207 passes the packet to the guest OS interface 1212 (block B1510). If a registered entry is found (Yes in block B1505), the table search/port determination module 1206 resets the survival time of the registered entry to a default value (block B1506). The reception report/packet data passing module 1207 passes the packet to the transmission source interface corresponding to the port number (block B1507).

The processing for transmission/reception packet data in the client computer is described with reference to sequence diagrams in FIG. 21 and FIG. 22.

When the guest OS 121 is started, the management agent 123 is also started. The management agent 123 requests the guest OS to open a set number of ports so that other communication applications and services in this guest machine do not use the port numbers used by other virtual machines. Thus, a port number is allocated to the management agent 123 by the guest OS 121 (1 to 3). This opened port is not used by the guest OS 121 and the management agent 123, and the guest OS 121 only opens the port. This prevents the communication applications and services on the guest OS 121 from using this port.

The management agent 123 notifies, to the virtual machine manager 118, the port number of the port allocated by the guest OS 121 (4). The virtual machine manager 118 requests the notified port number to be used as a transmission source port number (4.1). The virtual machine manager 118 requests the opening of the port (5). When transmitting data, the virtual machine manager 118 notifies to the control domain OS 111 that the virtual machine manager 118 will transmit data thereto (6). The virtual machine manager 118 then transmits data to the control domain OS 111 (7). The control domain OS 111 transmits the packet to the port switch 1001 (7.1). The port switch 1001 registers the number of the port used for the transmission of the packet in the table 1209 (7.1.1). The port switch 1001 requests the LAN controller 235 to transmit the packet (7.1.2). The LAN controller 235 transmits the packet (7.1.2.1).

When the LAN controller 235 receives the packet (8), the LAN controller 235 passes the packet to the port switch 1001

(8.1). The port switch 1001 searches the table 1209 for an entry having the protocol number and the destination port number (DP) included in the packet (8.1.1). If an entry having the protocol number and the destination port number (DP) included in the packet is found in the table 1209 and the port number included in the entry corresponds to the control domain OS interface 1211 (8.1.1.1), the port switch 1001 sends the packet to the control domain OS 111 (8.1.1.2). The control domain OS 111 passes the packet to the virtual machine manager (9).

Having received the packet (10), the LAN controller 235 passes the packet to the port switch 1001 (10.1). The port switch 1001 searches the table 1209 for an entry having the protocol number and the destination port number (DP) included in the packet (10.1.1). If an entry having the protocol number and the destination port number (DP) included in the packet is found in the table 1209 and the port number included in the entry corresponds to the guest OS interface 1212, or if no entry having the protocol number and the destination port number (DP) is found in the table 1209 (10.1.1.1), the port switch 1001 sends the packet to the guest OS 121 (10.1.1.2).

If the packet is returned from the control domain OS 111 (11), the port switch 1001 sets, in the table 1209, an entry having the virtual LAN interface number, the protocol number, the transmission source port number (SP), and the survival time of the transmission request source (11.1). The port switch 1001 then requests the LAN controller 235 to transmit the packet (11.2). The LAN controller transmits the packet (11.2.1).

According to the communication method described above, the port numbers allocated to the management agent 123 from the guest OS 121 are notified to the virtual machine manager 118 of the control domain 110, and the range of available port numbers in the control domain OS 111 is set to the number of the range notified from the management agent 123. As a result, the communication service on the control domain OS 111 is used within this range of port numbers. This eliminates the conflict of port numbers between the guest virtual machine 120 and the control domain 110. Subsequently, a communication is started from each machine, and the aforementioned port switch 1001 causes the received packet to be received by the LAN interface of the proper virtual machine, thereby enabling a communication even if there are LAN interfaces having the same MAC address and IP address.

Owing to the port reservation by the management agent 123 and owing to the port switch 1001, it is not necessary to allocate a different MAC address to each virtual machine, so that one global MAC address is allocated, and one IP address is used and allocated thereto.

Furthermore, use is permitted only by the MAC address of the client PC even in a network environment where MAC addresses are filtered for security.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus configured to carry out a first virtual machine and a second virtual machine on a hypervisor, wherein the first virtual machine comprises: a first operating system configured to allocate a first port number used at the second virtual machine; a virtual machine management agent configured to notify, to the second virtual machine, the first port number; and a first transmission module configured to transmit a first transmission packet, the first transmission packet comprising a MAC header, an IP header, and a TCP/UDP header, the MAC header comprising a transmission source MAC address indicating a first MAC address, the IP header comprising a protocol value and a destination IP address indicating a protocol of a transport layer, and the TCP/UDP header comprising a first transmission source port number indicating a port number other than the first port number and a destination port number, the second virtual machine comprises: a second operating system configured to limit transmission source port numbers of packets to the first port number notified by the virtual machine management agent; a second transmission module configured to transmit a second transmission packet, the second transmission packet comprising a MAC header, an IP header, and a TCP/UDP header, the MAC header comprising a transmission source MAC address indicating the first MAC address, the IP header comprising a protocol value and a destination IP address indicating a protocol of a transport layer, and the TCP/UDP header comprising a second transmission source port number indicating the first port number, and a sorting module configured to transmit a transmission packet to a network when the transmission packet is transmitted by the first transmission module or the second transmission module, and to sort a received packet to the first virtual machine or the second virtual machine in accordance with a received destination port number in the received packet when the received packet is received via the network, the received packet comprising a MAC header, an IP header, and a TCP/UDP header, the MAC header comprising a destination MAC address indicating the first MAC address, the IP header comprising a protocol value and a destination IP address indicating a protocol of a transport layer, and the TCP/UDP header comprising the received destination port number.

2. The information processing apparatus of claim 1, further comprising a network controller configured to communicate with the network, a MAC address indicating the first MAC address being allocated to the network controller.

3. The information processing apparatus of claim 1, wherein the sorting module comprises: a registration module configured to register an entry in a transmission/reception information table, the entry comprising a port number indicating a transmission source port number included in a included in a transmission packet transmitted from the first transmission module or the second transmission module, and a first protocol value indicating a protocol value included in the transmission packet, a determination module configured to determine whether an entry is present in the transmission/reception information table, the entry comprising a transmission source port number corresponding to the received destination port number included in the received packet and a first protocol number corresponding to the protocol value included in the received packet and a third transmission module, configured to transmit the received packet to the first operating system or the second operating system corresponding to the transmission source port number included in the entry when the entry is determined to be present.

4. The information processing apparatus of claim 3, wherein the registration module is configured to store time information indicating a time in the entry, and the information processing apparatus further comprises a deleting module configured to subtract the time indicated by the time information at regular time intervals, and to delete the entry from the transmission/reception information table when the time indicated by the time information reaches zero.

5. The information processing apparatus of claim 1, wherein the sorting module is configured to so, transmit the received packet to all ports when the protocol value indicates an address resolution protocol.

6. A communication control method for an information processing apparatus that carries out a first virtual machine and a second virtual machine on a hypervisor, the method comprising: allocating, by a first operating system located on the first virtual machine, a first port number used at the second virtual machine; notifying, by a virtual machine management agent located on the first virtual machine, to the second virtual machine, the first port number; transmitting, by a first transmission module located on the first virtual machine, a first transmission packet to the first transmission packet comprising a MAC header, an IP header, and a TCP/UDP header, the MAC header comprising a transmission source MAC address indicating a first MAC address, the IP header comprising a protocol value and a destination IP address indicating a protocol of a transport layer, and the TCP/UDP header comprising a first transmission source port number indicating a port number other than the first port number and a destination port number; limiting, by a second operating system located on the second virtual machine, transmission source port numbers of packets to the first port number notified by the virtual machine management agent; transmitting, by a second transmission module located on the second virtual machine, a second transmission packet, the second transmission packet comprising a MAC header, an IP header, and a TCP/UDP header, the MAC header comprising a transmission source MAC address indicating the first MAC address, the IP header comprising a protocol value and a destination IP address indicating a protocol of a transport layer, and the TCP/UDP header comprising a second transmission source port number indicating the first port number; transmitting a transmission packet to a network when the transmission packet is transmitted by the first transmission module or the second transmission module, and sorting a received packet to the first virtual machine or the second virtual machine in accordance with a received destination port number in the received packet when the received packet is received via the network, the received packet comprising a MAC header which comprises a destination MAC address indicating the first MAC address, an IP header which comprises a protocol value and a destination IP address indicating a protocol of a transport layer, and a TCP/UDP header comprising the received destination port number.

7. The communication control method of claim 6, further comprising communicating, by a network controller, a MAC address indicating the first MAC address being allocated to the network controller with the network.

8. The communication control method of claim 6, wherein the sorting further comprises: registering an entry in a transmission/reception information table, the entry comprising a port number indicating a transmission source port number included in a transmission packet transmitted from the first transmission module or the second transmission module, and a first protocol value indicating a protocol value included in the transmission packet, determining whether an entry is present in the transmission/reception information table, the entry comprising a transmission source port number corresponding to the received destination port number included in the received packet and a first protocol number corresponding to the protocol value included in the received packet, and transmitting the received packet to the first operating system or the second operating system corresponding to the transmission source port number included in the entry when the entry is determined to be present.

9. The communication control method of claim 8, further comprising: storing time information indicating a time in the entry, subtracting the time indicated by the time information at regular time intervals, and deleting the entry from the transmission/reception information table when the time indicated by the time information reaches zero.

10. The communication control method of claim 6, further comprising transmitting the received packet to all ports when the protocol value indicates an address resolution protocol.

11. An information processing apparatus, executing on a processor, that includes a first virtual machine and a second virtual machine on a hypervisor, wherein the first virtual machine comprises: a first operating system that allocates a first port number used at the second virtual machine; a virtual machine management agent that notifies the second virtual machine of the first port number; and a first transmission module that transmits a first transmission packet, the first transmission packet comprising a MAC header, an IP header, and a TCP/UDP header, the MAC header comprising a transmission source MAC address indicating a first MAC address, the IP header comprising a protocol value and a destination IP address indicating a protocol of a transport layer, and the TCP/UDP header comprising a first transmission source port number indicating a port number other than the first port number and a destination port number, the second virtual machine comprises: a second operating system that limits transmission source port numbers of packets to the first port number notified by the virtual machine management agent; a second transmission module that transmits a second transmission packet, the second transmission packet comprising a MAC header, an IP header, and a TCP/UDP header, the MAC header comprising a transmission source MAC address indicating the first MAC address, the IP header comprising a protocol value and a destination IP address indicating a protocol of a transport layer, and the TCP/UDP header comprising a second transmission source port number indicating the first port number, and a sorting module that transmits a transmission packet to a network when the transmission packet is transmitted by the first transmission module or the second transmission module, and sorts a received packet to the first virtual machine or the second virtual machine in accordance with a received destination port number in the received packet when the received packet is received via the network, the received packet comprising a MAC header, an IP header, and a TCP/UDP header, the MAC header comprising a destination MAC address indicating the first MAC address, the IP header comprising a protocol value and a destination IP address indicating a protocol of a transport layer, and the TCP/UDP header comprising the received destination port number.

12. The information processing apparatus of claim 11, further comprising a network controller that communicates a MAC address indicating the first MAC address being allocated to the network controller with the network.

13. The information processing apparatus of claim 11, wherein the sorting module comprises: a registration module that registers an entry in a transmission/reception information table, the entry comprising a port number indicating a transmission source port number included in a transmission packet transmitted from the first transmission module or the second transmission module, and a first protocol value indicating a protocol value included in the transmission packet, a determination module that determines whether an entry is present in the transmission/reception information table, the entry comprising a transmission source port number corresponding to the received destination port number included in the received packet and a first protocol number corresponding to the protocol value included in the received packet, and a third transmission module that transmits the received packet to the first operating system or the second operating system corresponding to the transmission source port number included in the entry when the entry is determined to be present.

14. The information processing apparatus of claim 13, wherein the registration module further stores time information indicating a time in the entry, and the information processing apparatus further comprises a deleting module that decrements the time indicated by the time information at regular time intervals, and deletes the entry from the transmission/reception information table when the time indicated by the time information reaches zero.

15. The information processing apparatus of claim 11, wherein the sorting module transmits the received packet to all ports when the protocol value indicates an address resolution protocol.

* * * * *